United States Patent [19]
Kawasaki et al.

[11] Patent Number: 5,527,633
[45] Date of Patent: Jun. 18, 1996

[54] SOLID OXIDE FUEL CELLS, A PROCESS FOR PRODUCING SOLID ELECTROLYTE FILMS AND A PROCESS FOR PRODUCING SOLID OXIDE FUEL CELLS

[75] Inventors: Shinji Kawasaki, Nagoya; Shigenori Ito, Kasugai; Katsuki Yoshioka, Himeji, all of Japan

[73] Assignee: NGK Insulators, Ltd., Japan

[21] Appl. No.: 119,690

[22] Filed: Sep. 13, 1993

[30] Foreign Application Priority Data

| Sep. 17, 1992 | [JP] | Japan | 4-247965 |
| Sep. 17, 1992 | [JP] | Japan | 4-247966 |
| Sep. 22, 1992 | [JP] | Japan | 4-252986 |

[51] Int. Cl.$^6$ .............. H01M 8/10; H01M 8/12
[52] U.S. Cl. ................. 429/30; 429/33
[58] Field of Search .............. 429/30, 33, 40

[56] References Cited

U.S. PATENT DOCUMENTS

| 3,522,103 | 7/1970 | White et al. | 136/120 |
| 3,645,894 | 2/1972 | Krystyniak | 252/1 |
| 5,134,042 | 7/1992 | Madou et al. | 429/13 |
| 5,281,490 | 1/1994 | Nishioka et al. | 429/33 |
| 5,298,235 | 3/1994 | Worrell et al. | 429/33 |

FOREIGN PATENT DOCUMENTS

| 0167723 | 1/1986 | European Pat. Off. . |
| 0410420 | 1/1991 | European Pat. Off. . |
| 0513982 | 11/1992 | European Pat. Off. . |
| 0524013 | 1/1993 | European Pat. Off. . |
| 1528247 | 7/1968 | France . |
| 61-198570 | 9/1986 | Japan . |
| 61-198569 | 9/1986 | Japan . |
| 63-128566 | 6/1988 | Japan . |
| 3-62459 | 3/1991 | Japan . |
| 4-115469 | 4/1992 | Japan . |
| 9215122 | 9/1992 | WIPO . |

OTHER PUBLICATIONS

"Sunshine Journal" 1981, vol. 2, No. 1, pp. 26–37.
"A comprehensive engineering for energies" 13–2, 1990, pp. 52– 68. (month n/a).
Solid State Ionics. vol. 52, No. 1–3, 1992, Amsterdam NL, pp. 269–275, A. R. Nicoll et al. "The potential of plasma spraying for the deposition of coatings on SOFC components". (month n/a).
Chemical Abstracts, vol. 83, No. 14, Oct. 6, 1975, Columbus, Ohio, US; abstract no. 120025x, "Plasma–torch spraying of zirconium dioxide stabilized with yttrium oxide containing iron (III) oxide and bismuth (III) oxide additions".

*Primary Examiner*—M. Nuzzolillo
*Attorney, Agent, or Firm*—Parkhurst, Wendel & Burr

[57] ABSTRACT

A solid oxide fuel cell having an ion conductive solid electrolyte layer formed by a spraying method, wherein a thickness of the solid electrolyte layer is not less then 40 μm and not more than 100 μm, and a leakage amount of $N_2$ gas of the solid electrolyte layer at room temperature is not more than $10^{-5}$ cc/g.second. A permeation coefficient of the solid electrolyte layer is preferably not more than $10^{-7}$ cm$^4$/g.second at room temperature. The solid electrolyte layer includes at least one metal element selected from manganese, iron, cobalt, nickel, copper and zinc, in an average amount of not less than 1 atom % and not more than 15 atom % based on a sum of amounts of all metal elements contained in the solid electrolyte layer.

17 Claims, 12 Drawing Sheets

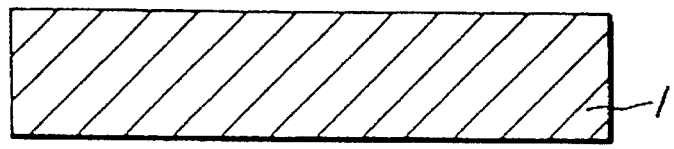
FIG_1a
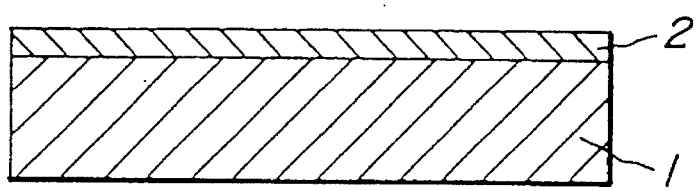
FIG_1b
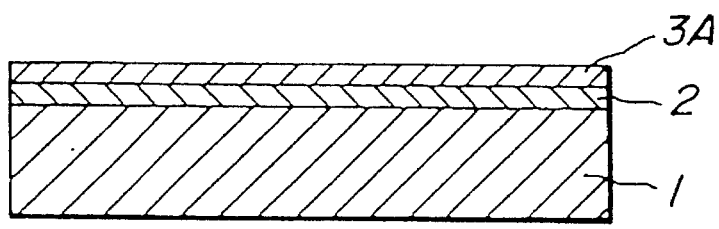
FIG_1c
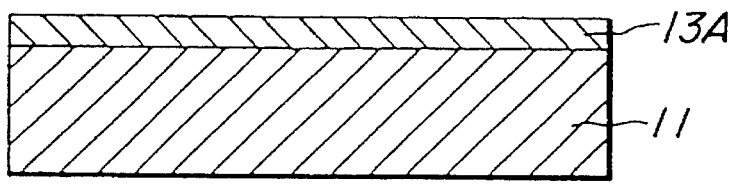
FIG_1d
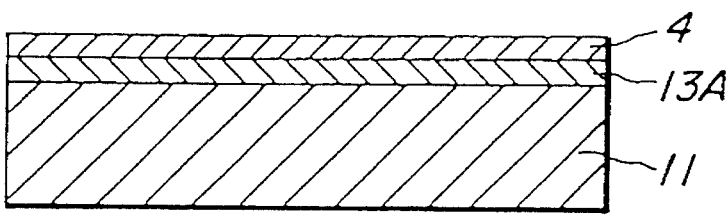
FIG_1e

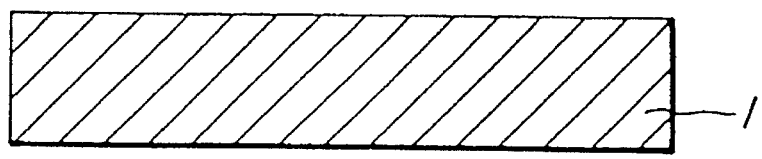
FIG_2a
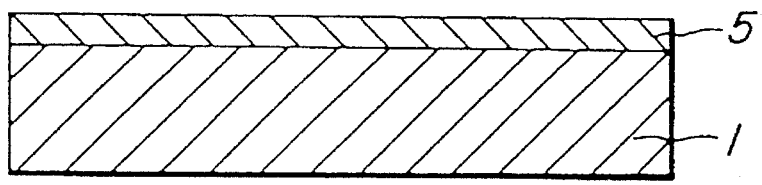
FIG_2b
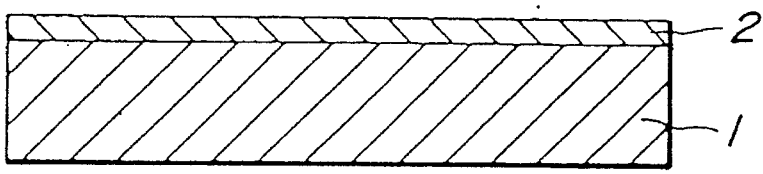
FIG_2c

FIG_7

FIG_8

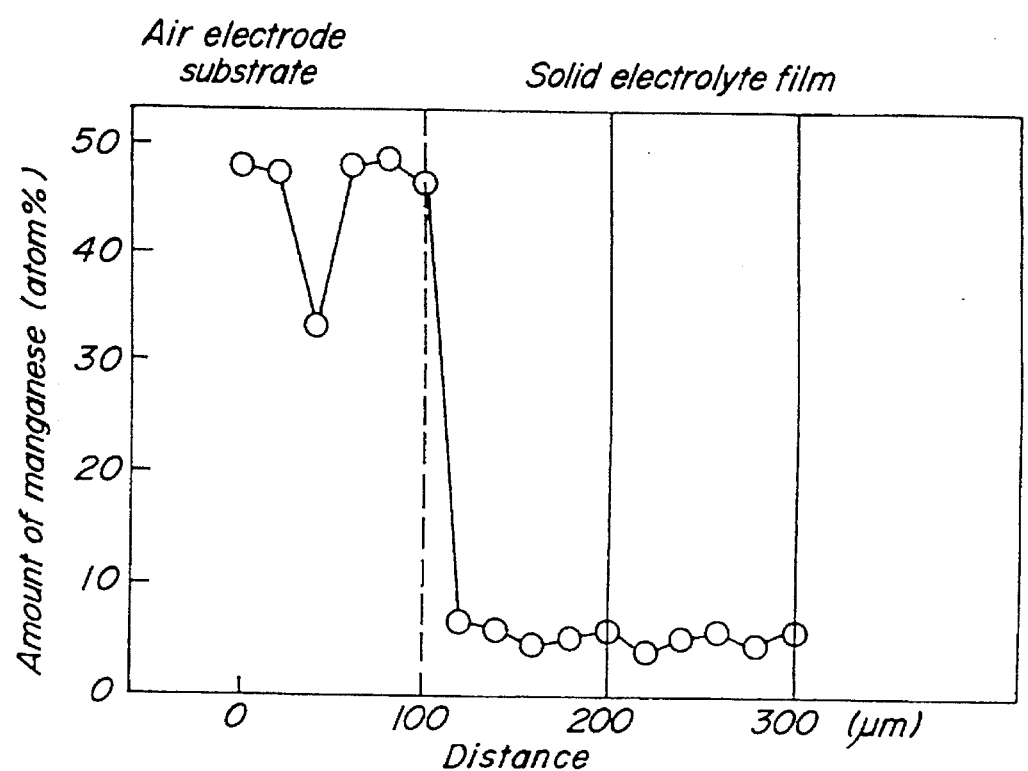
FIG_10
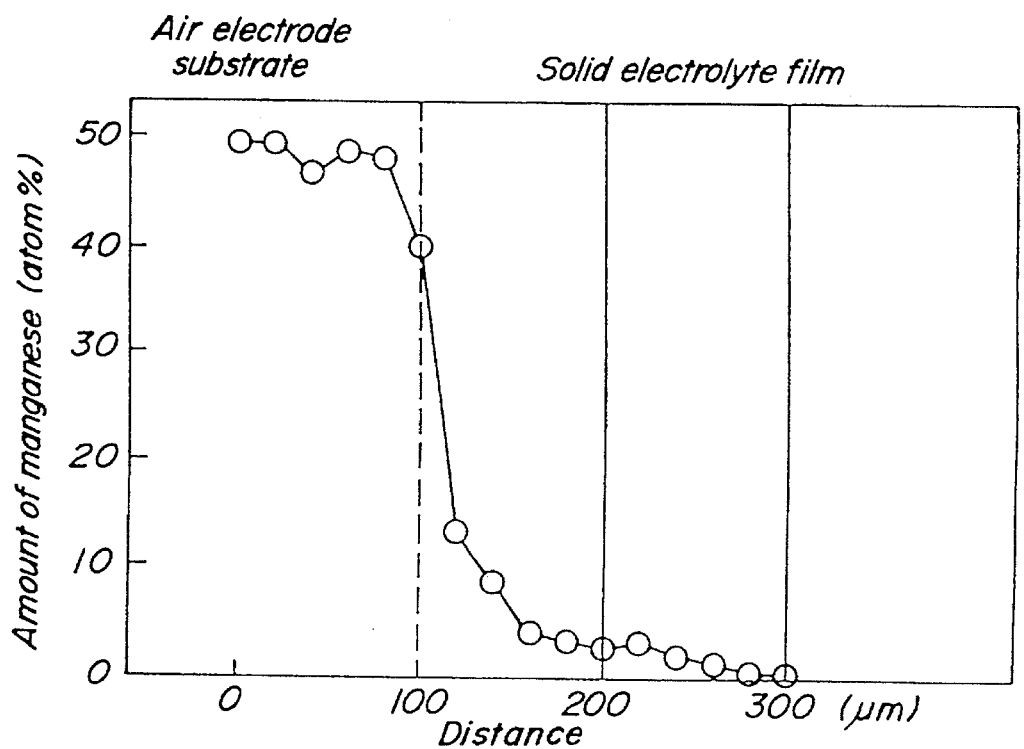
FIG_11

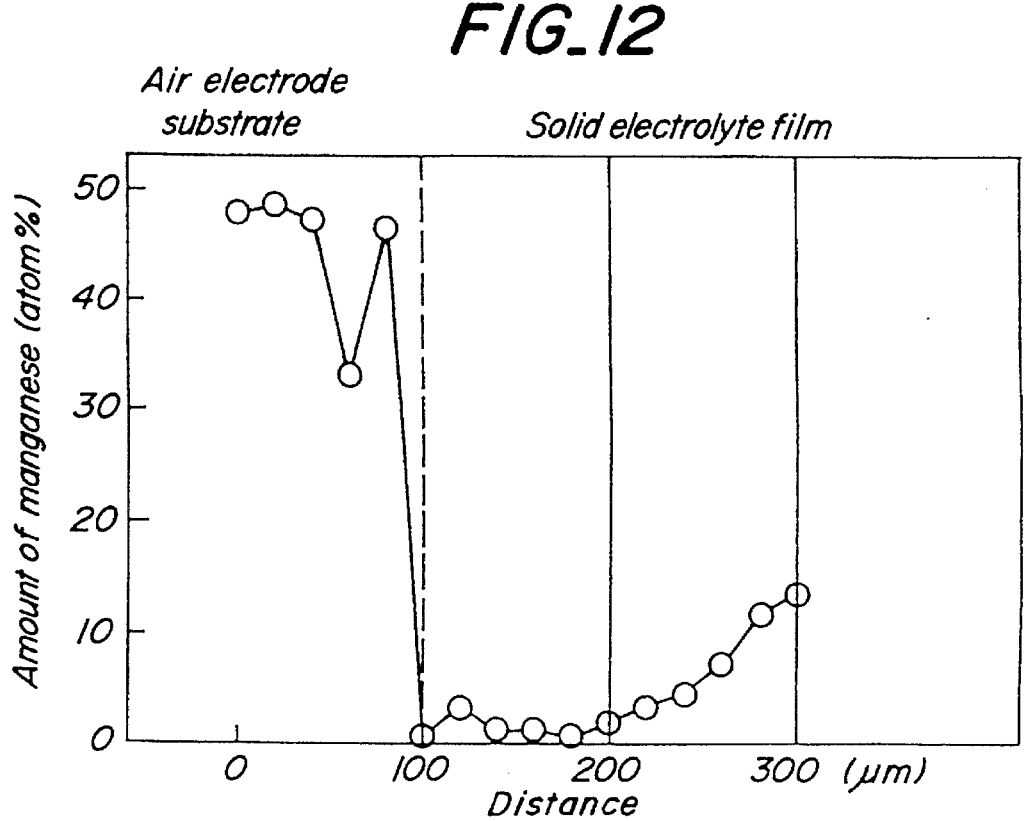
FIG_12
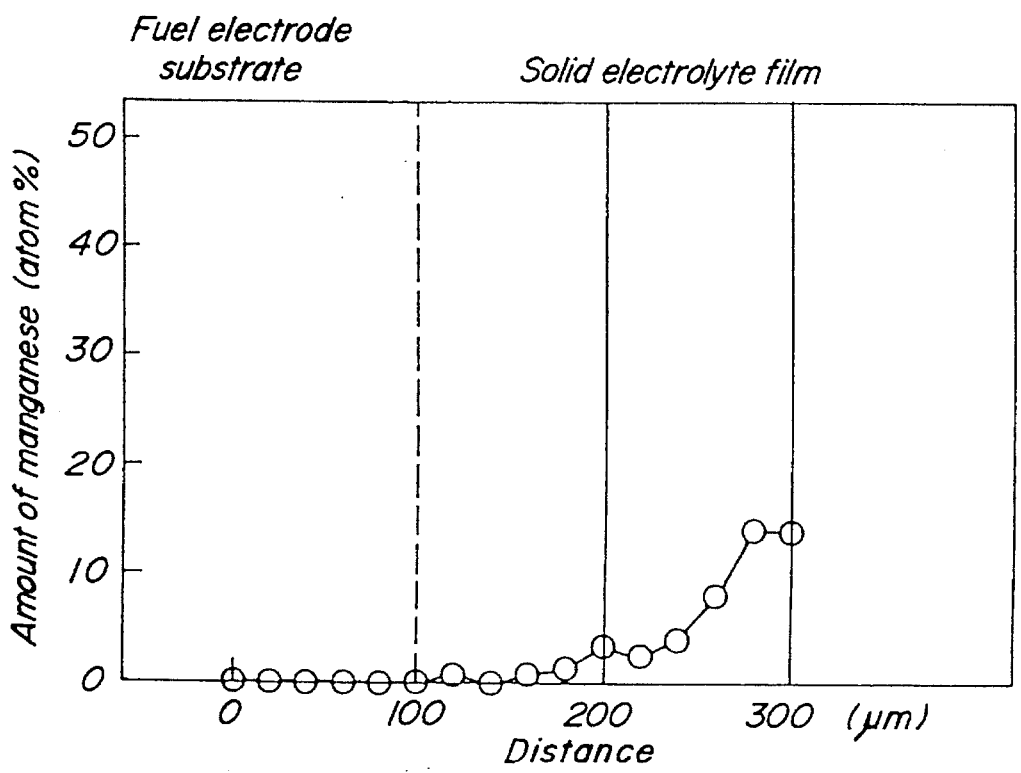
FIG_13

FIG_14
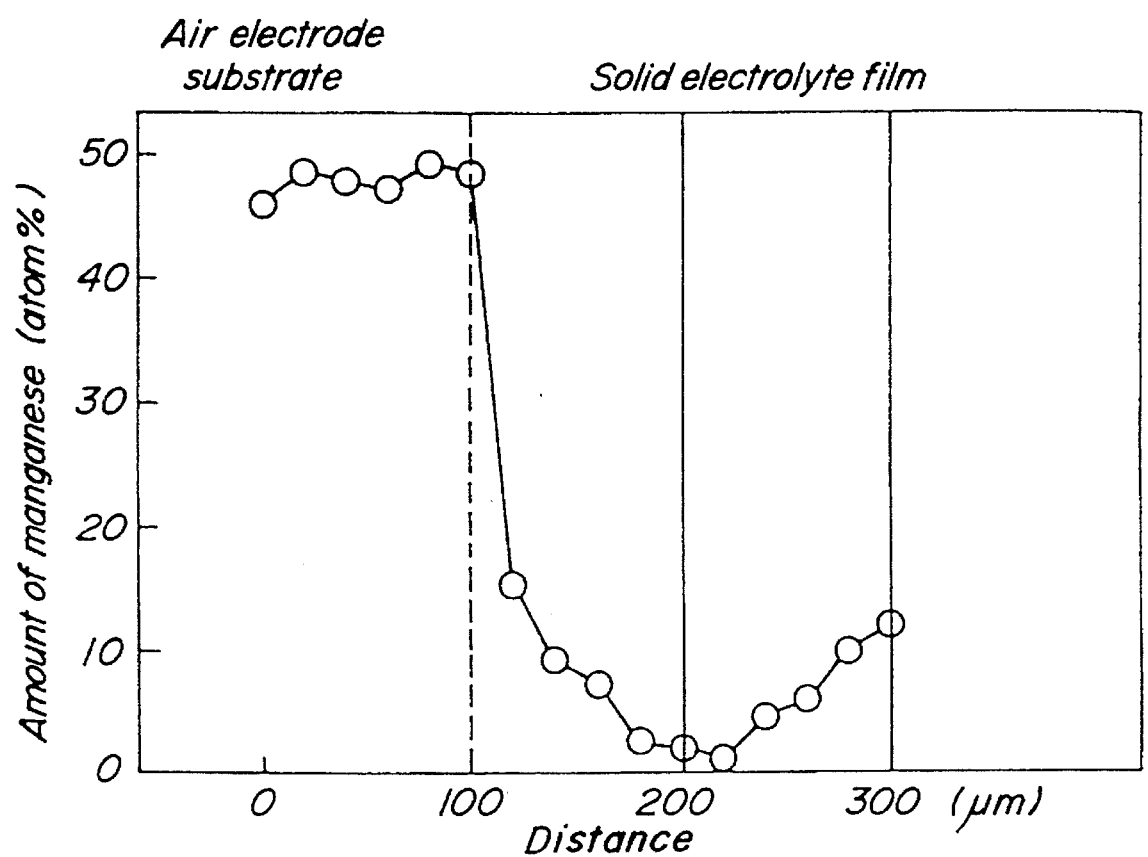

SOLID OXIDE FUEL CELLS, A PROCESS FOR PRODUCING SOLID ELECTROLYTE FILMS AND A PROCESS FOR PRODUCING SOLID OXIDE FUEL CELLS

BACKGROUND OF THE INVENTION

1. Field of the invention

The present invention relates to solid oxide fuel cells, a process for producing solid electrolyte films and a process for producing solid oxide fuel cells using such solid electrolyte films.

2. Description of the Related Art

Since solid oxide fuel cells (SOFC) operate at high temperatures of 1000° C. or more, the activity of the electrodes of the SOFC is extremely high. Thus, an expensive catalyst of a noble metal such as platinum is not necessary. In addition, since the SOFC has a low polarization and a relatively high output voltage, its energy conversion efficiency is conspicuously higher than that of other fuel cells. Furthermore, since all the constituent materials of the SOFC are solid, the SOFC is stable and has a long use life. Recently, a stabilized zirconia and a composite oxide, having a perovskite structure and including lanthanum, are the most common and promising materials for the constituent materials of a solid electrolyte film and of an air electrode of the SOFC, respectively ('A Comprehensive Engineering For Energies' 13-2, 1990).

Manufacturing processes of solid electrolyte films and air electrodes are generally categorized as a dry process and a wet process. An EVD method and a spray method are most common as the dry process. The wet process includes a tape casting method, a slip casting method, an extrusion method and the like ('A Comprehensive Engineering For Energies' 13-2, 1990).

When the solid electrolyte films and the air electrodes are manufactured by a vapor phase method such as a chemical vapor deposition (CVD), an electrochemically vapor deposition (EVD) or the like, an apparatus with a large scale is needed, and the treated area and the treating speed are too small. Moreover, in the vapor phase method, zirconium chloride or the like is used and aqueous vapor mixed with oxygen is used, therefore a running cost of the apparatus applying the vapor phase method is high.

When the solid electrolyte films are formed by applying a plasma spraying method, the film-forming speed is great, an apparatus applying the plasma spraying method can be handled easily and the films can be formed as thin and relatively dense films. For these merits, the plasma spraying method has heretofore been used for forming the solid electrolyte films ('Sunshine' 1981, Vol. 2, No. 1: 'A Comprehensive Engineering For Energies' 13-2, 1990).

The plasma spraying method is suitable for mass production, however, it is difficult to obtain an air tight film. On the other hand, the solid electrolyte film of the SOFC must be air tight to prevent lowering of the output due to leakage of fuel through the film. When applying the plasma spraying method, it was necessary to produce the solid electrolyte film with a thickness of not less than 200–300 μm for satisfying the above air-tight performance required for the solid electrolyte film of the SOFC (Japanese Patent Application Opened Number 128,566/1988). However, an electrical resistance of such a solid electrolyte film composed of zirconia is relatively high and contributes to the internal resistance of the single cell as the main factor. It is necessary to solve such problems. Therefore, it is required to produce a SOFC single cell, in which its solid electrolyte film is produced by applying a spraying method, having an opened circuit voltage near its theoretical value and to reduce the internal resistance of the single cell.

Besides, a porosity of the solid electrolyte film formed by the plasma spraying method is generally more than 5% and reaches up to 10%, so that the plasma-sprayed solid electrolyte film does not have sufficient density for a solid electrolyte film of a SOFC. That is, cracks or laminar defects occur in the film during the plasma spraying. For this reason, leakage of a fuel occurs in that the fuel, such as hydrogen or carbon monoxide, penetrates the film when operating the SOFC. Consequently, an electromotive force per a single cell of the SOFC is frequently smaller than that of an ideal SOFC in which the leakage does not occur, so that the output of the SOFC and a conversion rate of the fuel to electric power are reduced. Therefore, it is desired to improve the density of the solid electrolyte portion of the solid oxide fuel cell for preventing the leakage of the fuel when thinning the solid electrolyte portion so that the output per the single cell of the SOFC may be improved.

Besides, in the SOFC, a thinner film is preferable as the solid electrolyte film. However, when a vapor phase method, such as a chemical vapor deposition (CVD), an electrochemically vapor deposition (EVD) or the like, is applied for thinning the electrolyte film, an apparatus with a large scale is needed, and the treated area and the treating speed are too small. Therefore, a cost for producing the film is high, it is difficult to produce the solid electrolyte film with a large area, and moreover, the above EVD method may be applicable only when the solid electrolyte film is formed onto a tubular substrate.

Further, it is known that a grain size of a raw material to be plasma sprayed, in which cerium oxide or zirconium oxide is solid solved with an oxide of an alkaline earth metal element or a rare earth element, is adjusted, and then the raw material is plasma sprayed to form a solid electrolyte film (Japanese Patent Application Opened Numbers 198,569/1986 and 198,570/1986).

However, a film produced by the plasma spraying is not generally densified enough. Therefore, when a solid electrolyte film of a SOFC is produced by the plasma spraying as described above, such film does not have a sufficient density required for the SOFC. For this reason, a leakage of a fuel occurs in that the fuel, such as hydrogen or carbon monoxide, penetrates the film when operating the SOFC. Consequently, an electromotive force per a single cell of the SOFC is smaller than, for example, 1 V in an ideal SOFC in which the leakage does not occur, so that an output of the SOFC and a conversion rate of the fuel to electric power are reduced.

In this case, it may be considered that a thickness of the solid electrolyte film is increased to prevent the leakage of the fuel. However, a resistance against diffusion of ions in the film is increased in this case, and consequently, a resistance of the cell becomes large. Therefore, a technique is desired for improving the output of power generation per the single cell by densifying the solid electrolyte film and thinning the same without causing the leakage of the fuel.

As a method for solving such problems, in Japanese Patent Application Opened Numbers 115,469/1992 and 62,459/1991, a method is disclosed that a solid electrolyte film of a SOFC is formed by plasma spraying and the film thus formed by plasma spraying is then subjected to a heat treatment. However, the film thus formed by plasma spraying contains many defects therein, so that it is difficult to obtain a film having a sufficient air-tight performance. In particular, for obtaining a high quality film having a permeation coefficient of $N_2$ gas not more than $10^{-7}$ $cm^4 g^{-1}$ $s^{-1}$, it is necessary to subject the film formed by plasma spraying to the heat treatment for a long time at a high temperature not lower than 1550° C.

Much energy and time are consumed for carrying out the above heat treatment for a long time at such a high temperature, so that a cost for producing the film is considerably increased. Moreover, the film produced by plasma spraying adheres to a substrate which is also subjected to the heat treatment at a high temperature not lower than 1550° C., so that the substrate may be deteriorated or deformed during the heat treatment. In particular, a porous substrate is used in the SOFC. Such a porous substrate is sintered at a high temperature not lower than 1550° C., so that a dimension of the porous substrate becomes small and permeation of an oxidant or a fuel in the porous substrate is interrupted. Consequently, the SOFC having such a porous substrate which has undergone the heat treatment does not work effectively.

SUMMARY OF THE INVENTION

It is an object of the present invention to provide a SOFC single cell having an opened circuit voltage near its theoretical value and to reduce an internal resistance of the single cell.

It is another object of the present invention to improve the density of a solid electrolyte portion of a solid oxide fuel cell for preventing leakage of a fuel when thinning the solid electrolyte portion, so that an output per a single cell of the SOFC may be improved.

It is another object of the present invention to provide a solid electrolyte film having a sufficient air-tight performance, when applying steps of: forming a sprayed film composed of a solid electrolyte with a spraying method suitable for mass production; and subjecting the sprayed film to a heat treatment at a relatively low temperature.

A first aspect of the present invention provides a solid oxide fuel cell having a solid electrolyte portion formed by a spraying method as an ion conductor, a thickness of said solid electrolyte portion being not less than 40 μm and not more than 100 μm and an amount of $N_2$ gas leakage of said solid electrolyte portion at a room temperature being not more than $10^{-5}$ cc/g.second.

The present inventors have made studies for producing an air tight solid electrolyte portion of a SOFC. In a process of this study, the present inventors made an attempt that one or more metal element, which was selected from a group consisting of manganese, iron, cobalt, nickel, copper and zinc, was incorporated into a film composed of a solid electrolyte and the portion was then subjected to a heat treatment. Consequently, the inventors found that said metal element (which was selected from a group consisting of manganese, iron, cobalt, nickel, copper and zinc) progressed the densification of the resulting solid electrolyte portion. As a result, when applying such solid electrolyte portion having a thickness of not more than 100 μm, an output of the SOFC single cell is considerably improved to a value near the theoretical value of the output. It has been impossible to obtain the SOFC single cell having such a high output by using a conventional solid electrolyte film formed with a spraying method.

The present inventors have made further studies based on the above knowledge. As a result, the output of the SOFC single cell may be improved to a value near the theoretical value by using a solid electrolyte portion having an amount of $N_2$ gas leakage at a room temperature being not more than $10^{-5}$ cc/g.second. Moreover, the inventors successfully obtained the portion having a thickness of not more than 100 μm and an amount of $N_2$ gas leakage at a room temperature being not more than $10^{-5}$ cc/g-second, which made it possible to provide the SOFC single cell having an output near its theoretical value. Such a thin portion has not been considered practical as a solid electrolyte portion formed with a spraying method for a SOFC. Moreover, an internal resistance of the single cell is considerably decreased by using the solid electrolyte portion, formed with a spraying method, having a thickness of not more than 100 μm.

However, when the thickness of the solid electrolyte portion is decreased below 40 μm, quality of the portion is deteriorated and gas leakage is observed. Such result is probably due to the fact that Rmax of the solid electrolyte portion formed with a spraying method is about 30 μm and pinholes may occur in the portion when its thickness is decreased below 40 μm.

In the preferred embodiment of the invention, a permeation coefficient of $N_2$ gas of the solid electrolyte portion is not more than $10^{-7} cm^4$/g.second. This coefficient indicates the quality of the solid electrolyte portion: The lower the coefficient is, the higher the quality is.

The above solid electrolyte portion is preferably composed essentially of a zirconium oxide selected from the group consisting of a stabilized zirconium oxide and a partially stabilized zirconium oxide, each containing at least one metal element selected from a group consisting of manganese, iron, cobalt, nickel, copper and zinc. In this embodiment, the inventors further found the following facts. When the metal element is contained in a solid electrolyte portion in an amount of not more than 1 atom %, the solid electrolyte portion is not sufficiently densified as described above. Generally, an amount of the metal element, in which it may be solid solved within the solid electrolyte, varies depending on a temperature at which the solid electrolyte portion is subjected to a heat treatment and the metal element added to the portion. Particularly, when the metal element is contained in the portion in an amount of more than 15 atom %, an electric resistance of the solid electrolyte portion is conspicuously increased. Generally, the electric resistance is reduced by thinning the portion. However, a resistivity of the solid electrolyte is increased simultaneously to contribute to the electric resistance as a major factor. The inventors assume that an amount of the metal element is beyond an upper limit of an amount in which the metal element may be solid solved in the solid electrolyte. As a result, a considerable amount of the metal element is precipitated in grain boundaries in the portion and therefore the resistivity of the solid electrolyte is increased.

Such precipitation of the metal element into the grain boundaries may be effectively reduced by increasing the temperature at which the solid electrolyte portion is subjected to a heat treatment. However, a porous electrode in the SOFC cell is sintered and densified by the heat treatment at such an increased temperature. Such densified electrode is inappropriate for supplying a fuel or an oxidant.

The metal element may preferably be contained in an amount of 3–12 atom % for obtaining the solid electrolyte portion having a more densified microstructure and a relatively low resistivity.

The above amount of the metal element is indicated in a scale of atom % and a sum of amounts (indicated in a scale of atom %) of all metal elements contained in the solid electrolyte portion is 100 atom %. When two or more metal elements are selected from the group and contained in the portion, a sum of the amounts of the metal elements are 1–15 atom %.

A second aspect of the present invention provides a solid oxide fuel cell having a solid electrolyte portion as an ion conductor, characterized in that at least one metal element selected from the group consisting of manganese, iron, cobalt, nickel, copper and zinc is contained in said solid electrolyte portion in an average amount of not less than 1 atom % and not more than 15 atom % based on a sum of amounts of all metal elements contained in the solid electrolyte portion.

The inventors found that a solid electrolyte portion having air-tight performance superior to that of prior ones when at least one metal element selected from the group consisting of manganese, iron, cobalt, nickel, copper and zinc is contained in said solid electrolyte portion. Consequently, it is possible to obtain the solid electrolyte portion having sufficient air-tight performance for preventing leakage of a fuel when thinning the solid electrolyte portion. An internal resistance of a SOFC single cell may be reduced and an output per single cell may be improved by thinning the solid electrolyte portion.

The inventors further found that when the metal element is contained in the solid electrolyte portion in an average amount of less than 1 atom %, the solid electrolyte portion is not sufficiently densified as described above. Generally, an amount of the metal element, in which it may be solid solved within the solid electrolyte, varies depending on a temperature at which the solid electrolyte portion is subjected to a heat treatment and the metal element added to the portion. Particularly, when the metal element is contained in the portion in an average amount of more than 15 atom %, an electric resistance of the solid electrolyte portion is conspicuously increased. Generally, the electric resistance is reduced by thinning the portion. However, a resistivity of the solid electrolyte is increased simultaneously to contribute to the electric resistance as a major factor. The inventors assume that an amount of the metal element is beyond an upper limit of an amount in which the metal element may be solid solved in the solid electrolyte. As a result, a considerable amount of the metal element is precipitated in grain boundaries in the portion and therefore the resistivity of the solid electrolyte is increased.

Such precipitation of the metal element into the grain boundaries may be effectively reduced by increasing the temperature at which the solid electrolyte portion is subjected to a heat treatment. However, a porous electrode in the SOFC cell is sintered and densified by the heat treatment at such an increased temperature. Such densified electrode is inappropriate for supplying a fuel or an oxidant.

The metal element may preferably be contained in an average amount of 3–12 atom % for obtaining the solid electrolyte portion having more densified microstructure and a relatively low resistivity. The metal element may more preferably be contained in an average amount of 5–10 atom %.

The above amount of the metal element is indicated in a scale of atom % and a sum of amounts (indicated in a scale of atom %) of all metal elements contained in the solid electrolyte portion is 100 atom %. When two or more metal elements are selected from the group and contained in the portion, a sum of the amounts of the metal elements are 1–15 atom %.

When the solid electrolyte portion is formed of a stabilized zirconia or a partially stabilized zirconia, manganese and cobalt are preferable as the selected metal element, because manganese and cobalt may be easily solid solved with the stabilized zirconia or the partially stabilized zirconia. Particularly, manganese may be solid solved with the stabilized zirconia in an amount of up to about 15 atom % by a heat treatment at 1500° C. and the stabilized zirconia is widely used solid electrolyte material for a SOFC application. Therefore, manganese is the most preferred element in the above six metal elements.

Moreover, a third aspect of the present invention provides a process for producing a solid electrolyte film comprising:

preparing a powdery raw material for a solid electrolyte having an average particle diameter of 10–40 μm;

said powdery raw material is mixed with a compound of at least one metal element selected from the group consisting of manganese, iron, cobalt, nickel, copper and zinc to obtain a mixed powder, said powdery raw material and said compound being mixed so that an amount of said metal element is not less than 1 atom % and not more than 15 atom % based on a sum of amounts of all metal elements contained in the mixed powder;

forming a sprayed film by a spraying method using said mixed powder; and then subjecting said sprayed film to a heat treatment at a temperature of 1350° C.–1500° C. to form an air-tight solid electrolyte film.

Moreover, the present invention provides a process for producing a solid oxide fuel cell having one electrode, another electrode and an air-tight solid electrolyte film, said process comprising:

preparing a powdery raw material for a solid electrolyte having an average particle diameter of 10–40 μm;

said powdery raw material is mixed with a compound of at least one metal element selected from the group consisting of manganese, iron, cobalt, nickel, copper and zinc to obtain a mixed powder, said powdery raw material and said compound being mixed so that an amount of said metal element is not less than 1 atom % and not more than 15 atom % based on a sum of amounts of all metal elements contained in the mixed powder;

forming a sprayed film by a spraying method on a surface of said one electrode using said mixed powder;

then subjecting said sprayed film to a heat treatment at a temperature of 1350° C.–1500° C. to form said air-tight solid electrolyte film; and forming said another electrode on a surface of said solid electrolyte film.

Moreover, a fourth aspect of the present invention provides a process for producing a solid electrolyte film comprising:

preparing a powdery raw material for a solid electrolyte having an average particle diameter of 10–40 μm;

preparing a powdery additive of a compound of at least one metal element selected from a group consisting of manganese, iron, cobalt, nickel, copper and zinc;

said powdery raw material and said powdery additive are supplied into a spray gun portion by means of separate apparatuses for supplying powders, respectively, said powdery raw material and said powdery additive being supplied so that an amount of said metal element is not less than 1 atom % and not more than 15 atom % based on a sum of amounts of all metal elements contained in said powdery raw material and said powdery additive;

producing a molten mixture of said powdery raw material and said powdery additive in said spray gun portion;

spraying said molten mixture to form a sprayed film; and then subjecting said sprayed film to a heat treatment at a temperature of 1350° C.–1500° C. to form an air-tight solid electrolyte film.

Moreover, the present invention provides a process for producing a solid oxide fuel cell having one electrode, another electrode and an air-tight solid electrolyte film, said process comprising:

preparing a powdery raw material for a solid electrolyte having an average particle diameter of 10–40 μm;

preparing a powdery additive of a compound of at least one metal element selected from the group consisting of manganese, iron, cobalt, nickel, copper and zinc;

said powdery raw material and said powdery additive are supplied into a spray gun portion by means of separate apparatuses for supplying powders, respectively, said powdery raw material and said powdery additive being supplied so that an amount of said metal element is not less than 1 atom % and not more than 15 atom % based on a sum of amounts of all metal elements contained in said powdery raw material and said powdery additive;

producing a molten mixture of said powdery raw material and said powdery additive in said spray gun portion;

spraying said molten mixture on a surface of said one electrode to form a sprayed film;

then subjecting said sprayed film to a heat treatment at a temperature of 1350° C.–1500° C. to form said air-tight solid electrolyte film; and forming said another electrode on a surface of said solid electrolyte film.

Moreover, a fifth aspect of the present invention provides a process for producing a solid electrolyte film comprising:

mixing a powdery raw material for a solid electrolyte and a compound of at least one metal element selected from the group consisting of manganese, iron, cobalt, nickel, copper and zinc to obtain a mixed powder, said powdery raw material and said compound being mixed so that an amount of said metal element is not less than 1 atom % and not more than 15 atom % based on a sum of amounts of all metal elements contained in said mixed powder;

form said mixed powder into a granulated powder having an average particle diameter of 10–40 μm;

forming a sprayed film by a spraying method using said granulated powder; and then subjecting said sprayed film to a heat treatment at a temperature of 1350° C.–1500° C. to form an air-tight solid electrolyte film.

Moreover, the present invention provides a process for producing a solid oxide fuel cell having one electrode, another electrode and an air-tight solid electrolyte film, said process comprising:

mixing a powdery raw material for a solid electrolyte and a compound of at least one metal element selected from the group consisting of manganese, iron, cobalt, nickel, copper and zinc to obtain a mixed powder, said powdery raw material and said compound being mixed so that an amount of said metal element is not less than 1 atom % and not more than 15 atom % based on a sum of amounts of all metal elements contained in said mixed powder;

form said mixed powder into a granulated powder having an average particle diameter of 10–40 μm;

forming a sprayed film on a surface of said one electrode by a spraying method using said granulated powder;

then subjecting said sprayed film to a heat treatment at a temperature of 1350° C.–1500° C. to form an air-tight solid electrolyte film; and forming said another electrode on a surface of said solid electrolyte film.

In the third and fourth aspects of the present invention, the powdery raw material for a solid electrolyte has an average particle diameter of 10–40 μm. This "average particle diameter" means an average particle diameter of minimum size particles of the powdery raw material when supplying the material into a spray gun by means of an apparatus for supplying powders, and does not mean an average particle diameter of agglomerated particles composed of primary particles, which may be formed due to humidity or the other factors. This "minimum size particles" are usually primary particles. However, when the primary particles are granulated into granules, this granules are considered to be the above "minimum size particles". Such granules include granules produced by forming the primary particles by means of a spray drying method.

In the third and fifth aspects of the present invention, the powdery raw material for a solid electrolyte and the compound of at least one selected metal element are mixed. In this mixing step, the powdery raw material for a solid electrolyte may be mixed with a powder of the compound. Moreover, the powdery raw material for a solid electrolyte may be mixed with a solution of the compound.

In the process of producing a solid electrolyte film and a solid oxide fuel cell according to the present invention, the sprayed film is subjected to a heat treatment to densify the sprayed film and to obtain an air-tight solid electrolyte film. After the heat treatment, it is possible to obtain the air-tight solid electrolyte film with substantially no microcracks or laminar defects usually seen in conventional plasma sprayed films and with densified and uniform microstructure.

Moreover, in the third aspect of the invention, a powdery raw material for a solid electrolyte is mixed with a compound of at least one metal element selected from the group consisting of manganese, iron, cobalt, nickel, copper and zinc to obtain a mixed powder. The inventors found that the selected metal element progresses densification of the sprayed film when subjecting the sprayed film to the heat treatment. Consequently, it is possible to produce the solid electrolyte film with sufficiently densified structure by the heat treatment when the treatment is carried out at a lower temperature and in a shorter time.

Moreover, in the fourth aspect of the invention, a powdery additive of a compound of at least one metal element selected from the group consisting of manganese, iron, cobalt, nickel, copper and zinc and a powdery raw material for a solid electrolyte are supplied into a spray gun portion by means of separate apparatuses for supplying powders, respectively, and then a molten mixture of the powdery raw material and the powdery additive is produced in the spray gun. In the aspect, the above metal element diffuses uniformly over the whole sprayed film and progresses densification of the sprayed film during the heat treatment.

Moreover, in the fifth aspect of the invention, a compound of said at least one metal element and a powdery raw material for a solid electrolyte are mixed to obtain a mixed powder, and then the mixed powder is formed into a granulated powder. In the aspect, the above metal element also progresses densification of the sprayed film during the heat treatment. In the aspect, the mixed powder may be formed into the granulated powder in different methods. In a first method, the mixed powder is calcined to produce a calcined product, which is then granulated to produce a granulated product. This product is then classified by means of a sieve and the resulting classified powder is used as the above granulated powder. In a second method, water is added to the mixed powder to produce a slurry which is then formed to the above granulated powder by means of a spray drier.

Moreover, in the third and fifth aspect of the present invention, an amount of said metal element is not less than 1 atom % and not more than 15 atom % based on a sum of amounts of all metal elements contained in said mixed powder. In the aspects, the sum of amounts of all metal elements contained in the mixed powder is 100 atom %.

Moreover, in fourth aspect of the present invention, an amount of said metal element is not less than 1 atom % and not more than 15 atom % based on a sum of amounts of all metal elements contained in said powdery raw material and said powdery additive. In the aspect, the sum of amounts of all metal elements contained in the powdery raw material and the powdery additive is 100 atom %.

When the amount of the selected metal element is less than 1 atom %, the resulting solid electrolyte film is not sufficiently densified as described above. An average particle size of the powdery raw material or the granulated powder also affects the densification of the film as described below. However, generally, it is necessary to increase a temperature at which the sprayed film is subjected to the heat treatment for producing a solid electrolyte film with sufficient air-tight performance. When the amount of the selected metal element is more than 15 atom %, the precipitation of the selected metal element easily occur in grain boundaries in the film as described above. Consequently, a resistivity of the solid electrolyte is increased and an output of a single cell is decreased. The selected metal element may preferably be contained in an amount of 3–12 atom % and may more preferably be contained in an amount of 5–10 atom %.

Moreover, the inventors found that the average particle diameter of the powdery raw material is a critical factor for the densification of the sprayed film. That is, it is possible to improve the air-tight performance of the solid electrolyte film by applying the powdery raw material having a smaller average particle diameter when a temperature at which the heat treatment is carried out and an amount of the compound of the selected metal element are not changed. Moreover, when the sprayed film is subjected to the heat treatment at a lower temperature or an amount of the compound of the selected metal element is reduced, it is possible to avoid reduction of air-tight performance of a solid electrolyte film by applying the powdery raw material having a smaller average particle diameter.

When the average particle diameter is larger than 40 μm, it is necessary to carry out the heat treatment at a high temperature higher than about 1500° C. for producing the solid electrolyte film having the air-tight performance sufficient for a SOFC application. On the other hand, the average particle diameter is smaller than 10 μm, the powdery raw material may not be supplied into a spray gun efficiently. The average particle size may preferably be 15–30 μm.

In the fifth aspect of the invention, when an average particle size of the granulated powder is 10–40 μm, the above described effects are obtained. The average particle size of the granulated powder may preferably be 15–30 μm.

The solid electrolyte film produced by the method of the present invention is useful as a solid electrolyte film of an oxygen sensor or an oxygen sensitometer, and, because of its denseness, useful as an oxidation resistive film for covering a metal material.

Moreover, the solid electrolyte film produced by the method of the present invention may be formed as a dense and thin film having a high electric conductivity. Therefore, the solid electrolyte film may be applied as a solid electrolyte film of a solid oxide fuel cell and thus produced solid oxide fuel cell has a low internal resistance and a high output.

EVD method has been widely used for producing a thin and dense solid electrolyte film in a conventional solid oxide fuel cell. The method of the invention may be carried out easily compared to the EVD method. The solid electrolyte film may be produced only using a conventional sprayer and an electronic furnace for the heat treatment or the like in the invention. Therefore, a capital cost and a running cost for carrying out the invention are low.

When applying the EVD method, current tubular solid oxide fuel cells with relatively small sizes may be produced, however, it is difficult to produce SOFC's with flat shapes. On the other hand, when applying the method of the present invention, SOFC's with both tubular shapes and flat shapes may be produced easily, and moreover, an elongated tubular SOFC and a flat SOFC with a large area may be produced easily. The method of the present invention may be applied to SOFC's having rather complicated shapes.

These and other objects, features and advantages of the invention will be appreciated upon reading of the following description of the invention when taken in conjunction with the attached drawings, with the understandings that some modifications, variations and changes of the same could be made by the skilled person in the art to which the invention pertains without departing from the spirit of the invention or the scope of the claims attached hereto.

BRIEF DESCRIPTION OF THE DRAWINGS

FIGS. 1(a), (b), (c), (d) and (e) are cross sectional views schematically showing stages of a manufacturing process of a laminated body comprising an air electrode substrate 11, a solid electrolyte film 13A and a fuel electrode film 4.

FIG. 2(a) is a cross sectional view showing a material 1 for an air electrode, FIG. 2(b) is a cross sectional view showing a film 5 being formed on the material 1 by a wet process, and FIG. 2(c) is a cross sectional view showing an intermediate layer 2 being formed on the material.

FIGS. 10, 11, 12, 13 and 14 are graphs showing amounts of manganese measured by EPMA, respectively, and the amounts are measured at positions in a direction along the thickness of a single cell to be measured.

DESCRIPTION OF THE PREFERRED EMBODIMENTS

Figure 3A:
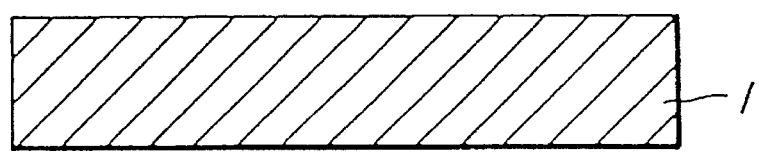
FIG. 3(a) is a cross sectional view showing a material 1 for an air electrode.

FIGS. 1 to 5 are figures for explaining first and second aspects of the present invention.

When a composite oxide having a perovskite structure and containing Lanthanum is used as a material for an air electrode and a solid electrolyte portion is formed of a stabilized zirconia or a partially stabilized zirconia, a layer having a high resistivity composed of Lanthanum zirconate ($La_2Zr_2O_7$), which is an electrical insulator, is formed between the solid electrolyte portion and the air electrode after a heat treatment at a temperature higher than about 1250° C. In this case, the inventors found that formation of the layer composed of Lanthanum zirconate is considerably reduced and the layer is hardly seen when manganese or cobalt is used as the above selected metal element. Consequently, an output of a single cell may advantageously be improved.

The solid electrolyte portion is generally in the form of a film or a plate. An air electrode is formed on one side of a solid electrolyte film or a solid electrolyte plate and a fuel electrode is formed on the other side thereof. Such an air electrode and a fuel electrode may be films formed on a surface of a substrate or a substrate capable of self-standing. A SOFC of the present invention includes SOFC with various shapes and types, such as so called planer type, tubular type and monolithic type. The tubular SOFC's include a tubular SOFC with its inner space for gas-flow opened at the both ends of the SOFC and a tubular SOFC with the inner space opened at one end and closed at the other end of the SOFC.

Said selected metal element is contained in the solid electrolyte portion in an average amount of not less than 1 atom % and not more than 15 atom % based on a sum of amounts of all metal elements contained in the portion. When the amount of the selected metal element is increased from one boundary to the other boundary of the solid electrolyte portion, the average amount over the whole area in the portion is 1–15 atom %. The amount of the selected metal element may be measured by an EPMA method.

In one example of first and second aspects of the present invention, the solid electrolyte portion is sandwiched by a pair of electrodes, and the amount of the selected metal element is increased in the portion from one boundary between the portion and one electrode to the other boundary between the portion and the other electrode. A method of manufacturing such single cell will be described below. In the example described below, the portion is a form of a film, however, the portion may be a form of a plate.

First, a material 1 for an air electrode with a predetermined shape such as a flat plate is prepared, as shown in FIG. 1(a). Then, an intermediate layer 2 is formed on a surface of the material 1 as shown in FIG. 1(b). The intermediate layer 2 is formed of a compound of at least one metal element selected from the group consisting of manganese, iron, cobalt, nickel, copper and zinc. The intermediate layer 2 may be preferably manufactured by a plasma spraying method in a view point of its high productivity. Then, a film 3A consisting of a material for a solid electrolyte is formed on the surface of the intermediate layer 2 to provide a laminated body, as shown in FIG. 1(c). The film 3A may also be preferably manufactured by a plasma spraying method.

The thus obtained laminated body is then subjected to a heat treatment. During the treatment, the intermediate layer 2 disappears by a mechanism as described below. That is, the intermediate layer 2 disappears on the surface of the material 1 and an air-tight solid electrolyte film 13A is formed on the surface of an air electrode substrate 11, as shown in FIG. 1(d). Then, as shown in FIG. 1(e), a fuel electrode film 4 is formed on the surface of the solid electrolyte film 13A.

Alternatively, the intermediate layer 2 may be formed by a wet process which will be explained referring to FIG. 2(a)–(c). That is, as shown in FIG. 2(a), the material 1 for an air electrode is prepared. Then, as shown in FIG. 2(b), a film 5 containing a compound of the selected metal element is formed on the surface of the material 1 by a wet process. The wet process includes a dipping method, a slip casting method, an extrusion method etc.. Then, the film 5 is subjected to a heat treatment to evaporate ingredients such as a solvent in the film 5. The intermediate layer 2 consisting of the compound of the selected metal element is thus formed as shown in FIG. 2(c). Then, a SOFC single cell may be manufactured by a process as described above referring to FIGS. 1 (c), (d) and (e).

In the present examples, as shown in FIG. 1(c), the intermediate layer 2 is formed between the material 1 and the film 3A to form the laminated body consisting of these three layers. When the laminated body is subjected to the heat treatment, the selected metal element moves from the intermediate layer 2 to the film 3A and diffuses into the film 3A. As a result, the selected metal is solid solved into at least a region of the film 13A near a boundary between the film 13A and the air electrode substrate 11. The present inventors found that the thus diffused metal element progresses the densification of the film 13A. Moreover, the inventors analyzed the solid electrolyte film 13A using an EPMA measuring apparatus. As a result, the metal element is contained in a relatively large amount and the densification is relatively progressed in the region of the film 13A near the boundary between the film 13A and the air electrode substrate 11. On the other hand, the metal element is contained in a relatively small amount in a region of the film 13A near a boundary between the film 13A and the fuel electrode film 4. In the solid electrolyte film, the metal element is contained in a relatively large amount (the metal element is diffused) and the microstructure of the solid electrolyte film is densified in substantially the same region, as shown in the result of the EPMA measurement and in photographs taken by a scanning type electron microscope.

When a composite oxide having a perovskite structure and containing Lanthanum is used as a material for the air electrode 1 and a material for a solid electrolyte is a stabilized zirconia or a partially stabilized zirconia, the above selected metal element diffuses to considerably reduce the formation of the layer composed of Lanthanum zirconate during the heat treatment, as described above. Such effect is most considerable when manganese or cobalt is used as the above selected metal element.

When the composite oxide having a perovskite structure and containing Lanthanum is used, a part of the A site of its composition containing Lanthanum may preferably be replaced with strontium and/or calcium when the solid electrolyte is a stabilized zirconia or a partially stabilized zirconia, the material for the solid electrolyte may preferably be a mixture of zirconia and a compound (especially an oxide) of a metal element selected from an alkaline-earth metal element and a rare earth element, or, the material may preferably be a material consisting of zirconia solid solved with the compound of the above metal element.

In the manufacturing process as described above referring to FIGS. 1 and 2, the air electrode and the fuel electrode may be replaced with each other. In this case, the intermediate layer 2 and the film 3A are formed on a fuel electrode substrate to provide a laminated body successively and the laminated body is subjected to the heat treatment to form an air-tight solid electrolyte film. In the solid electrolyte film, the selected metal element is contained in a relatively large amount in a region of the film near the boundary between the film and the fuel electrode substrate, and the metal element is contained in a relatively small amount in a region of the film near a boundary between the film and an air electrode film.

Moreover, the following manufacturing methods may be applied.

That is, a film consisting of a material for a solid electrolyte is formed on a surface of a fuel electrode substrate. A surface layer of at least one metal element selected from the group consisting of manganese, iron, cobalt, nickel, copper and zinc is formed on the surface of the film to provide a laminated body, which is then subjected to a heat treatment. During the heat treatment, the selected metal element contained in the surface layer diffuses in the solid electrolyte to densify it and to provide an air-tight solid electrolyte film, and the surface layer disappears. Then, an air electrode film is formed on the surface of the air-tight solid electrolyte film.

In the above manufacturing method, the air electrode and the fuel electrode may be replaced with each other. That is, a film consisting of a material for a solid electrolyte is formed on a surface of an air electrode substrate. A surface layer of at least one metal element selected from the group consisting of manganese, iron, cobalt, nickel, copper and zinc is formed on the surface of the film to provide a laminated body, which is then subjected to a heat treatment. During the heat treatment, the selected metal element contained in the surface layer diffuses in the solid electrolyte to densify it and to provide an air-tight solid electrolyte film, and the surface layer disappears. Then, a fuel electrode film is formed on the surface of the air-tight solid electrolyte film.

Then, a manufacturing process, in which the intermediate layer 2 is not formed, will be described below. The material 1 for an air electrode is formed of $(La_{1-y}Ay)_{1-x}CoO_3$ or $(La1-y\ Ay)_{1-x}MnO_3$. 'A' is one or more element selected from an alkaline-earth metal. 'x' is $0<x\leq0.2$. 'y' is $0\leq y\leq0.4$. In this case, the film 3A is directly formed on the surface of the material 1 for an air electrode to provide a laminated film, which is then subjected to the heat treatment. The material 1 for an air electrode is formed of a composite oxide having a perovskite structure and containing Lanthanum in the A site of its composition, in which a part of the A site is not occupied by a metal element. By applying such material, manganese or cobalt diffuses from the material 1 for an air electrode to the solid electrolyte during the heat treatment. As a result, the densification of the solid electrolyte film is progressed by manganese or cobalt, and the formation of the layer composed of Lanthanum zirconate is considerably reduced.

In another example of the invention, a solid electrolyte portion is sandwitched between an air electrode and a fuel electrode, and in the solid electrolyte portion, an amount of the selected metal element in a region near a boundary between the portion and the air electrode is larger than an amount of the metal element in a central region of the solid electrolyte portion, and an amount of the metal element in a region near a boundary between the portion and the fuel electrode is larger than an amount of the metal element in the central region.

For manufacturing such SOFC's, it is necessary that the above selected metal element is diffused from the above two boundaries of the solid electrolyte portion, respectively. An example, in which the solid electrolyte portion is a form of a film, will be described below.

First, a material 1 for an air electrode with a predetermined shape such as a flat plate is prepared, as shown in FIG. 3(a).

Figure 3B:
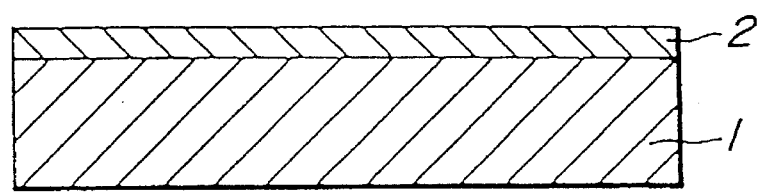
FIG. 3(b) is a cross sectional view showing an intermediate layer 2 being formed on the material 1.

Then, an intermediate layer 2, consisting of a compound of at least one metal element selected from the group consisting of manganese, iron, cobalt, nickel, copper and zinc, is formed on the surface of the material 1 as shown in FIG. 3(b). The intermediate layer 2 may be preferably manufactured by a plasma spraying method.

Figure 3C:
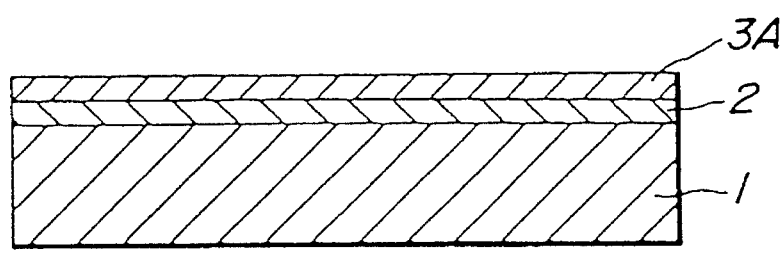
FIG. 3(c) is a cross sectional view showing a film 3A of a solid electrolyte material.

Then, a film 3A consisting of a material for a solid electrolyte is formed on the surface of the intermediate layer 2 to provide a laminated body, as shown in FIG. 3(c). The film 3A may also be preferably manufactured by a plasma spraying method.

Figure 4A:
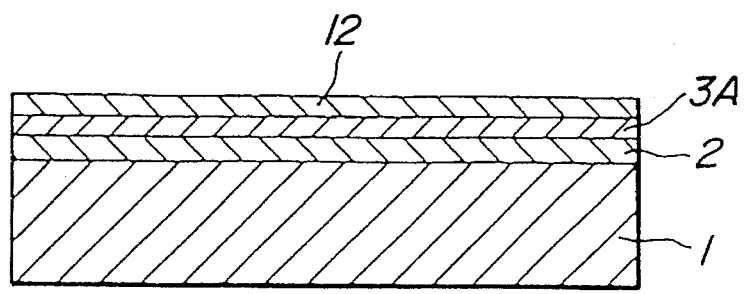
FIG. 4(a) is a cross sectional view showing a laminated body having a surface layer 12 being further formed on the film 3A of a solid electrolyte material.
Figure 4B:
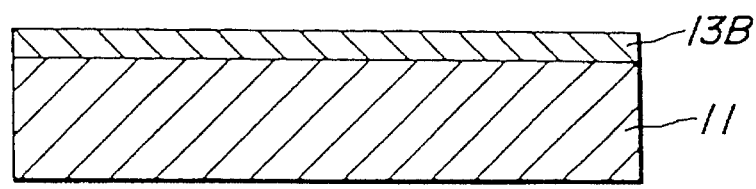
FIG. 4(b) is a cross sectional view showing a laminated body obtained by subjecting the laminated body of FIG. 4(a) to a heat treatment.

Then, as shown in FIG. 4(a), a surface layer 12, consisting of a compound of at least one metal element selected from the group consisting of manganese, iron, cobalt, nickel, copper and zinc, is formed on the surface of the film 3A to provide a laminated body, which is then subjected to a heat treatment. During the treatment, the intermediate layer 2 and the surface layer 12 disappear by a mechanism as described above. That is, the intermediate layer 2 disappears on the surface of the material 1 and, as shown in FIG. 4(b), an air-tight solid electrolyte film 13B is formed on the surface of an air electrode substrate 11. Then, as shown in FIG. 4(c), a fuel electrode film 4 is formed on the surface of the solid electrolyte film 13B.

Alternatively, the surface layer 12 may be formed by a wet process which will be explained below. As shown in FIG. 4(a), the film 3A consisting of a material for a solid electrolyte is formed. Then, a film containing a compound of the selected metal element is formed on the surface of the film 3A by a wet process. The wet process includes a dipping method, a spray coating method, a screen printing method etc.. Then, the film containing the compound is dried to form the surface layer 12 as shown in FIG. 4(a).

Figure 4C:
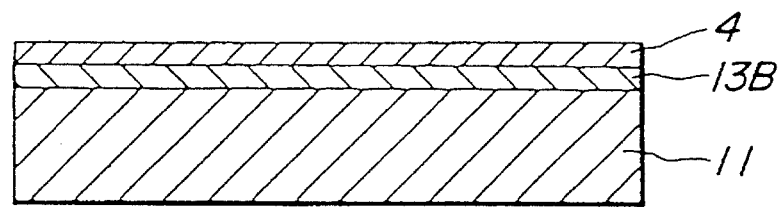
FIG. 4(c) is a cross sectional view showing a fuel electrode film 4 being further formed on the the laminated body of FIG. 4(b).

When applying the above manufacturing methods, in the solid electrolyte film 13B as shown in FIG. 4(c), an amount of the selected metal element in a region near a boundary between the portion and the air electrode substrate 11 is larger than an amount of the metal element in a central region of the solid electrolyte film 13B, and an amount of the metal element in a region near a boundary between the portion and the fuel electrode film 4 is larger than an amount of the metal element in the central region. The metal element diffuses most efficiently in the two regions near the two boundaries of the solid electrolyte film 13B. A smaller amount is selected from the amounts of the metal element both in the region near the boundary between the portion and the air electrode substrate 11 and in the region near the boundary between the portion and the fuel electrode film 4, and then the smaller amount is divided by the amount of the metal element in the central region of the solid electrolyte film 13B to provide a value which is preferably not less than 1.3.

In the above manufacturing method, the air electrode and the fuel electrode may be replaced with each other. In this case, the intermediate layer 2 is formed on the surface of a fuel electrode substrate, the film 3A is formed on the surface of the intermediate layer 2, and the surface layer 12 is formed on the surface of the film 3A to provide a laminated body which is then subjected to the heat treatment.

In another example of first and second aspects of the present invention, amounts of the selected metal element are substantially constant in the solid electrolyte portion. This term "substantially constant" is understood that the amounts of the selected metal element are not substantially increased or decreased in the portion from one boundary with one electrode to the other boundary with the other electrode. When manufacturing the solid electrolyte portion in a practical system, changes, deviations and defects in the amounts inevitably occur in the portion. Such portion is also included in the example in which the amounts of the selected metal element is "substantially constant", when the amounts are not substantially increased or decreased in the portion from the two boundaries.

The present inventor's found that such SOFC single cell may be manufactured by the following three methods which will be described below concerning examples in which the solid electrolyte portion is a form of a film.

Figure 5A:
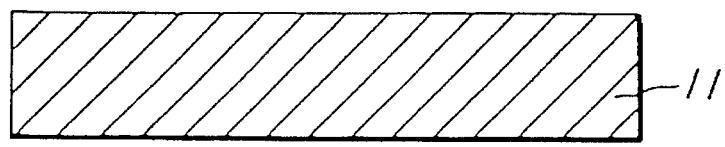
FIG. 5(a) is a cross sectional view showing the air electrode substrate 11.
Figure 5B:
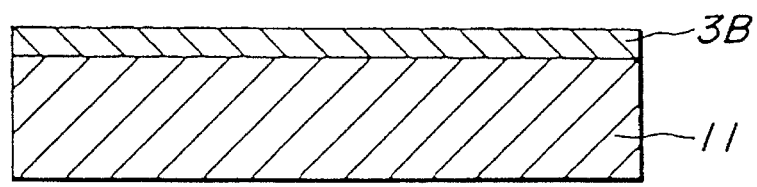
FIG. 5(b) is a cross sectional view showing a film 3B of a solid electrolyte material being formed on the air electrode substrate 11 to produce a laminated body.
Figure 5C:
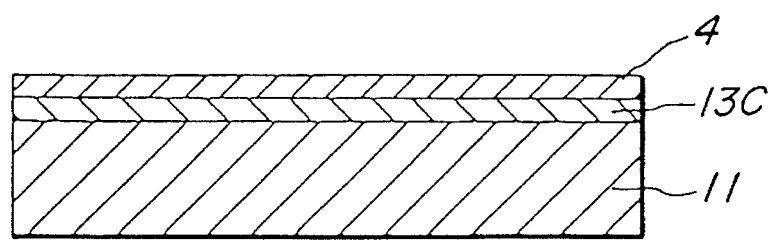
FIG. 5(c) is a cross sectional view showing a laminated body obtained by subjecting the laminated body of FIG. 5(b) to a heat treatment and further forming a fuel electrode film 4.

In a first method, one or more metal element selected from a group consisting of manganese, iron, cobalt, nickel, copper and zinc is contained in a material for a solid electrolyte. That is, a powdery raw material for a solid electrolyte and a powdery additive consisting of a compound of the metal element are mixed to provide a mixed powder, which is then calcined to provide a calcined material, in which the metal element is solid solved in the material for the solid electrolyte. Then, a film of the calcined material is formed. For example, referring to FIG. 5, the calcined material is sprayed on a surface of an air electrode substrate 11 shown in FIG. 5(a) to form a film 3B as shown in FIG. 5(b). Then, the film 3B is subjected to a heat treatment to form an air-tight solid electrolyte film 13C as shown in FIG. 5(c). A fuel electrode film 4 is formed on a surface of the solid electrolyte film 13C.

In a second method, the material for a solid electrolyte is sprayed on the air electrode substrate 11 to form the film 3B. A solution containing a compound of the above metal element is impregnated into at least the film 3B which is then dried and subjected to the heat treatment. The solution may be impregnated only into the film 3B, or may be impregnated into the film 3B and the substrate 11 simultaneously. The solution may be preferably impregnated into at least the film 3B by dipping the film 3B, with the substrate 11 if necessary, into the solution.

In a third method, a powdery additive of a compound of at least one metal element selected from the group consisting of manganese, iron, cobalt, nickel, copper and zinc and a powderly raw material for a solid electrolyte are supplied into a spray gun portion by means of separate apparatuses for supplying powders, respectively, and then the powdery additive and the powderly raw material are melted in the spray gun portion to provide a molten mixture. Then, the molten mixture in the spray gun portion is sprayed onto a surface of the air electrode substrate. In the above three methods, the air electrode and the fuel electrode may be replaced with each other.

In each manufacturing method explained above referring to FIGS. 1 to 5, the heat treatment of the material for the solid electrolyte may be preferably carried out at a temperature between 1300° C.–1500° C. Because, when the heat treatment is carried out at a temperature lower than 1300° C., the effect of the heat treatment for densifying the material for the solid electrolyte is not considerable and it is necessary to carry out the heat treatment for a long time to obtain the solid electrolyte portion with sufficiently densified microstructure. When the heat treatment is carried out at a temperature higher than 1500° C. it is difficult to prevent deformation of a porous substrate including the air electrode substrate. Moreover, much energy and much time are needed to carry out the heat treatment at a temperature higher than 1500° C., therefore a cost for manufacturing the air-tight solid electrolyte portion is very high.

In each manufacturing method as described above, as the compound of the selected metal element, the oxide, the carbonate or the powder of the metal is preferred.

In third, fourth and fifth aspects of the present invention each relating to a process for producing a solid electrolyte film and a solid oxide fuel cell, "the powdery raw material for a solid electrolyte" includes both a mixed powder and a solid solved powder. In a SOFC application, the mixed powder may preferably be a mixed powder of a zirconia powder or a ceria powder with a powder of a stabilizer. In a SOFC application, the solid solved powder may preferably be a powder of a compound consisting of zirconia or ceria solid solved with the stabilizer. Such stabilizer may preferably be a compound consisting of an alkaline earth metal or a rare earth metal element.

In third, fourth and fifth aspects of the present invention, a method for spraying may preferably be a plasma spraying method. A low pressure plasma spraying is more preferable for obtaining excellent effect of the invention. However, when applying an atmospheric plasma spraying method for forming a sprayed film, after the subsequent heat treatment, it is possible to obtain an air-tight solid electrolyte film with sufficiently densified microstructure.

The compound of the selected metal element includes the acetate, the nitrate, the sulfate, the salt of an organic acid, the oxide, the carbonate, the hydroxide and the like of the metal element, and the oxide, the carbonate and the hydroxide are preferred.

When a main component of the powdery raw material for a solid electrolyte is a zirconia, the air electrode substrate is formed of a composite oxide having a perovskite structure and containing Lanthanum and the material for a solid electrolyte is sprayed onto the surface of the air electrode substrate, an insulating layer composed of Lanthanum zirconate ($La_2Zr_2O_7$) etc. may be formed between the solid electrolyte film and the air electrode substrate after the subsequent heat treatment.

However, according to third, fourth and fifth aspects of the present invention each relating to a process for producing a solid electrolyte film and a solid oxide fuel cell, manganese or cobalt may be contained in the sprayed film, formation of such insulating layer may be thus prevented.

In first, second, third, fourth and fifth aspects of the present invention, the air electrode may be formed of doped or undoped $LaMnO_3$, $CaMnO_3$, $LaNiO_3$, $LaCoO_3$, $LaCrO_3$ or the like, among which $LaMnO_3$ doped with strontium or calcium is preferable. These doped or undoped $LaMnO_3$, $CaMnO_3$, $LaNiO_3$, $LaCoO_3$ and $LaCrO_3$ include a composite oxide having a perovskite structure in which its A site and B site are not substantially deficient, and include a composite oxide in which a part of the A site or B site is deficient, for example, in which La or Ca is contained in the A site and a part of the A site is deficient. Such composite oxide, in which La or Ca is contained in the A site and a part of the A site is deficient, effectively reduce the formation of $La_2Zr_2O_7$. Generally, the air electrode may be preferably made of a nickel-zirconia cermet or a cobalt-zirconia cermet. A fuel gas for SOFC's includes a gas containing a fuel such as hydrogen, reformed hydrogen, carbon monooxide, a hydrocarbon or the like. An oxidizing gas for SOFC's includes a gas containing oxygen.

Results of experiments relating to the invention are described below. The following experiments are given for explaining the present invention in more detail and not intended for limiting the same.

The following experiments 1 to 4 relate to the solid oxide fuel cell according to a first aspect of the invention.

Experiment 1

A powder of Lanthanum manganite was pressed with a pressure of 200 kgf/cm$^2$ to provide a formed body having a disk shape with a diameter of 50 mm and a thickness of 3 mm. The formed body was then sintered at a temperature of 1550° C. for 5 hours to provided a sintered body, which was then processed to provide an air electrode substrate having a porosity of 22% and having a disk shape with a diameter of 20 mm and a thickness of 1.5 mm. A powdery raw material consisting of a stabilized zirconia containing 8 mol % of $Y_2O_3$ (8YSZ) and a powdery additive of manganese dioxide ($MnO_2$) were prepared as materials for spraying. The powderly raw material of 8YSZ and the powdery additive of $MnO_2$ were supplied into a spray gun portion by means of separate apparatuses for supplying powders, respectively. Then the powdery additive and the powdery raw material were melted in the spray gun portion to provide a molten mixture, which was then sprayed onto a surface of the air electrode substrate to obtain a sprayed film with a thickness of about 600 μm. Then, the sprayed film was subjected to a heat treatment in an atmosphere at a temperature of 1450° C. for 5 hours to obtain a solid electrolyte film. An EPMA analysis for amounts of metal elements contained in the film was carried out on a cross section of the film along a direction of its thickness. As a result, amounts of manganese measured at positions in the film were substantially constant and manganese was contained in the film in an average amount of about 5.5 atom % based on a sum of amounts of Zr, Y and Mn.

Then, the resulting solid electrolyte film was processed by a machine to obtain experimental samples with thicknesses shown in FIG. 1. A part of each experimental sample was used for measuring its permeation coefficient of $N_2$ gas and its leakage amount of $N_2$ gas. The other part of each experimental sample was used as follows. A platinum paste was applied onto a surface of the solid electrolyte film and then fired to form an opposing electrode (a fuel electrode). Each test cell was thus produced. An open circuit voltage (OCV) and an ohmic resistance of each test cell was measured by introducing oxygen as an oxidizing gas and hydrogen humitized at a room temperature as a fuel gas at 1000° C. The results are shown in Table 1 and FIG. 6.

TABLE 1

| A thickness of the solid electrolyte film (μm) | OCV (V) | Resistance (Ωcm$^2$) |
|---|---|---|
| 500 | 1.11 | 0.67 |
| 200 | 1.11 | 0.29 |
| 100 | 1.11 | 0.14 |
| 70 | 1.11 | 0.10 |
| 60 | 1.11 | 0.09 |
| 50 | 1.11 | 0.08 |
| 40 | 1.10 | 0.07 |
| 30 | 0.93 | 0.05 |

As understood from the results of the OCV's shown in Table 1, a sufficiently high electromotive force (OCV) is obtained in the test cell having the solid electrolyte film of a thickness of 40 μm, and moreover, the resistance of the cell is only about ¼ comparing with the resistance of the cell having the film of a thickness of 200 μm, which thickness is general in conventional SOFC's. As shown in a graph in FIG. 6 indicating relationship of the thickness of the film and the leakage amount of $N_2$ gas, the leakage amount is not more than $10^{-5}$cc/g.second when the thickness is not less than 40 μm. Moreover, when the leakage amount is not more than $10^{-5}$cc/g.second, the OCV is 1.10 or 1.11 volt which is near its theoretical value.

Figure 6:
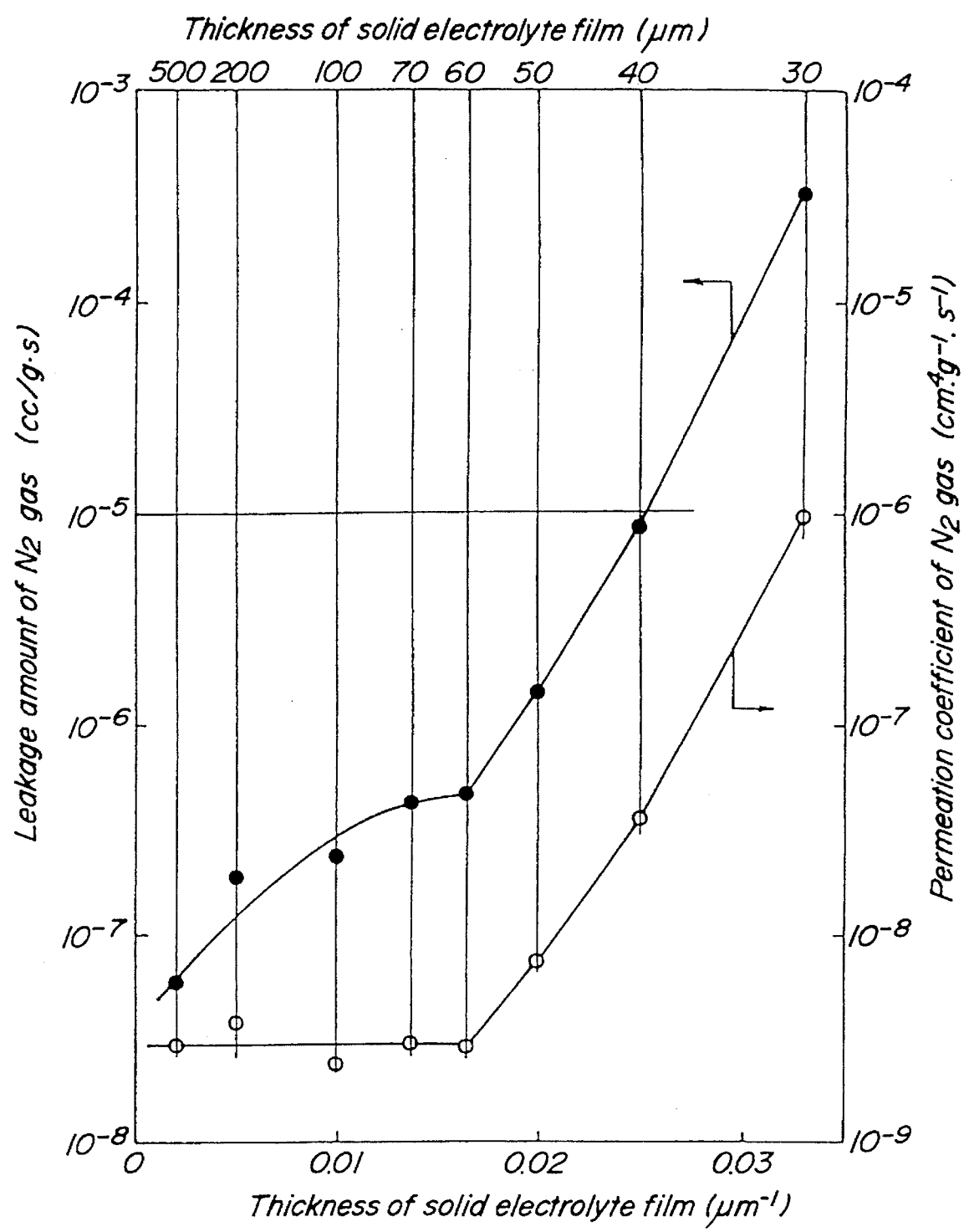
FIG. 6 is a graph showing relationship between thicknesses of solid electrolyte films and permeation coefficients of $N_2$ gas, and relationship between the thicknesses and amounts of $N_2$ gas leakage, in experiment 1 relating to first aspect of the present invention.

As understood by a graph in FIG. 6 indicating relationship of the thickness of the film and the permeation coefficient of $N_2$ gas, the solid electrolyte film has sufficiently densified and uniform microstructure when the thickness is not less than about 60 μm, on the other hand, quality of the film is conspicuously deteriorated when the thickness is less than 60 μm. Such results might be due to pinholes in the film having a thickness of less than 60 μm, and such pinholes may be formed because maximum surface roughnesses (Rmax) of the sprayed film and the substrate are about 30 μm. Then, the permeation coefficient of $N_2$ gas is increased up to about $10^{-7}$ cm$^4$/g-second when the thickness is about 40 μm. When the thickness is less than 40 μm, the permeation coefficient of $N_2$ gas is increased and that is, the quality of the film is deteriorated. As a result, the leakage amount of $N_2$ gas of the film is made larger than its acceptable upper limit and thus the OCV of the test cell is lowered.

On the other hand, when the thickness is not less than 60 μm, the permeation coefficient of $N_2$ gas is substantially constant. Such result may be due to the reason that the densification of the solid electrolyte film is progressed in a substantially same level in a region being not affected by the pinholes as described above. Therefore, when the thickness is not less than 60 μm, the leakage amount of $N_2$ gas is decreased substantially proportional to the thickness, as shown in the graph in FIG. 6.

Experiment 2

The same air electrode body, powdery raw material of 8 YSZ and powdery additive of $MnO_2$ as used in the experiment 1 were prepared. First, the powdery additive of Manganese dioxide was sprayed on the surface of the air electrode body to form an intermediate layer with a thickness of about 10 μm. Then, the material of 8YSZ was sprayed on the intermediate layer to form a sprayed layer with a thickness of about 600 μm to provide a laminated body, which was then subjected to a heat treatment in an atmosphere at a temperature of 1450° C. for 5 hours to obtain a solid electrolyte film. The thus obtained film was processed with a machine to obtain experimental samples with thicknesses shown in table 2. Moreover, a platinum paste was applied onto a surface of the solid electrolyte film and then fired to form an opposing electrode (a fuel electrode). Each test cell was thus produced and then tested as described in the experiment 1. The results are shown in Table 2 and FIG. 7.

TABLE 2

| A thickness of the solid electrolyte film (μm) | OCV (V) | Resistance ($\Omega cm^2$) |
|---|---|---|
| 500 | 1.10 | 0.65 |
| 200 | 1.10 | 0.27 |
| 100 | 1.11 | 0.13 |
| 70 | 1.11 | 0.10 |
| 60 | 1.11 | 0.09 |
| 50 | 1.11 | 0.08 |
| 40 | 1.10 | 0.07 |
| 30 | 0.91 | 0.05 |

As understood from Table 2, when a thickness of the solid electrolyte film was 40–100 μm, the electromotive force of the test cell was near its theoretical value and the resistance of the test cell was reduced to a relatively low value. When the thickness was 30 μm, the electromotive force was unexpectedly and critically decreased. Then, referring to FIG. 7, when the thickness was less than 40 μm, the leakage amount of $N_2$ gas was more than $10^{-5}$ cc/g.second. That is, the electromotive force was rapidly and unexpectedly decreased when the leakage amount of $N_2$ gas was about $10^{-5}$ cc/g.second.

Figure 7:
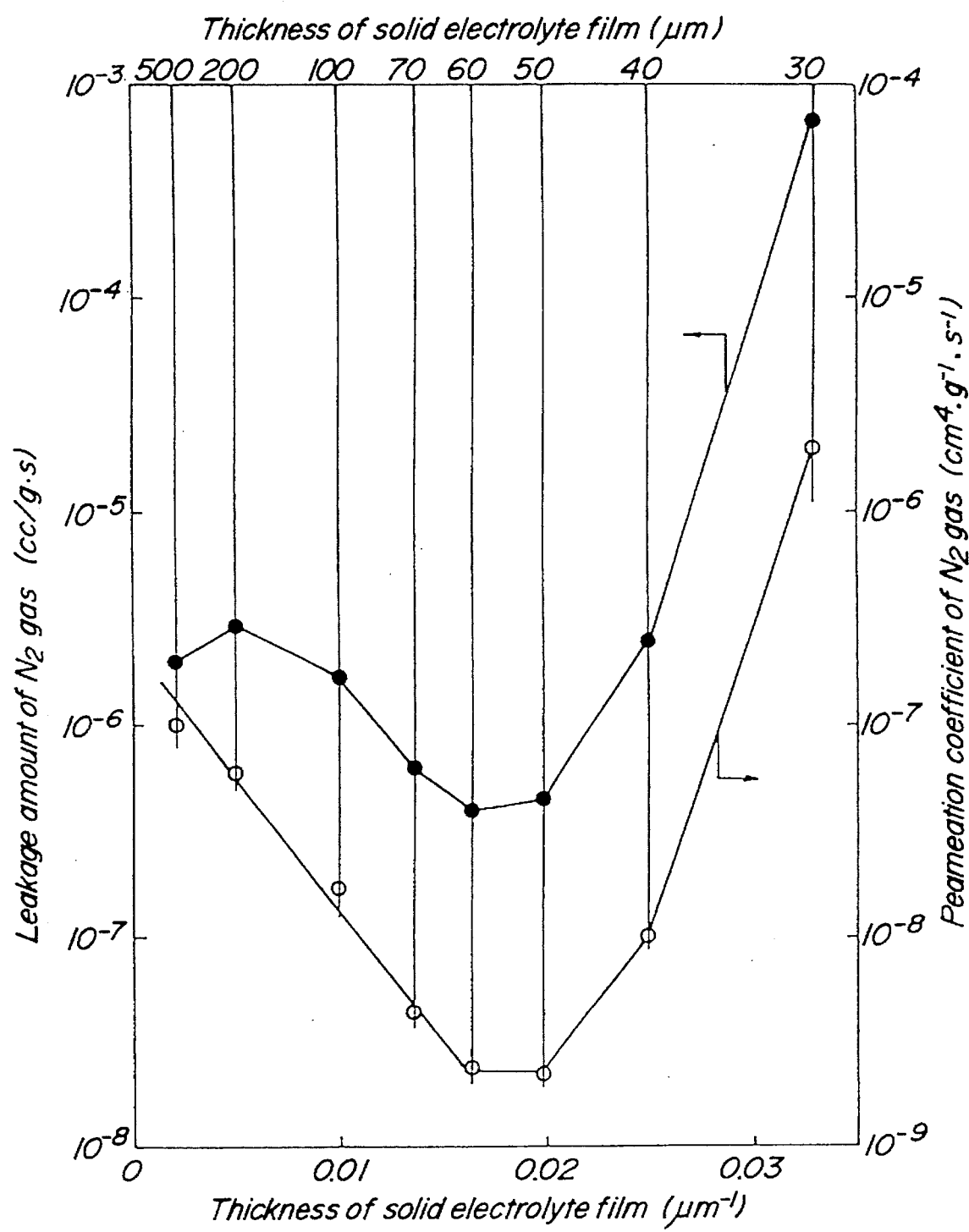
FIG. 7 is a graph showing relationship between thicknesses of solid electrolyte films and permeation coefficients of $N_2$ gas, and relationship between the thicknesses and amounts of $N_2$ gas leakage, in experiment 2 relating to first aspect of the present invention.

Moreover, referring to a graph in FIG. 7 showing relationship of a permeation coefficient of $N_2$ gas and the thickness, when the thickness was 50–60 μm, the permeation coefficient of $N_2$ gas was minimum and the quality of the film was most improved in this range of the thickness. When the thickness was less than 50 μm, said effect of the surface roughness of the film described in the experiment 1 was shown. When the thickness was less than 40 μm, the permeation coefficient of $N_2$ gas was rapidly decreased due to said effect of the pinholes, and therefore, the leakage amount of $N_2$ gas came to be beyond $10^{-5}$ cc/g.second. It was also interesting that when the thickness was larger than 60 μm, the permeation coefficient of N 2 gas was increased and the average quality of the film was rather deteriorated. Therefore, when the thickness was made larger than 60 μm, the leakage amount of N 2 gas was not decreased. These results may be considered that manganese diffused mainly in a region 50–60 μm distant from a boundary of the film and the air electrode, and the densification of the microstructure of the film was considerably progressed in the above region. Such consideration was also supported by results of observations of the solid electrolyte films by means of an EPMA apparatus and a SEM.

Experiment 3

The same air electrode substrate and powdery raw material of 8 YSZ as used in the experiment 2 were prepared. The powdery raw material of 8 YSZ was sprayed on the surface of the air electrode body to form a sprayed film with a thickness of about 600 μm, which was then processed with a machine to obtain experimental samples with thicknesses shown in Table 3. Moreover, a platinum paste was applied onto a surface of the solid electrolyte film and then fired to form an opposing electrode (a fuel electrode). Each test cell was thus produced and then tested as described in the experiment 1. The results were shown in Table 3 and FIG. 8.

TABLE 3

| A thickness of the solid electrolyte film (μm) | OCV (V) | Resistance ($\Omega cm^2$) |
|---|---|---|
| 500 | 0.96 | 0.83 |
| 200 | 0.91 | 0.33 |
| 100 | 0.75 | 0.12 |
| 50 | 0.43 | 0.08 |
| 40 | about 0 | 0.06 |
| 30 | about 0 | 0.05 |

Figure 8:
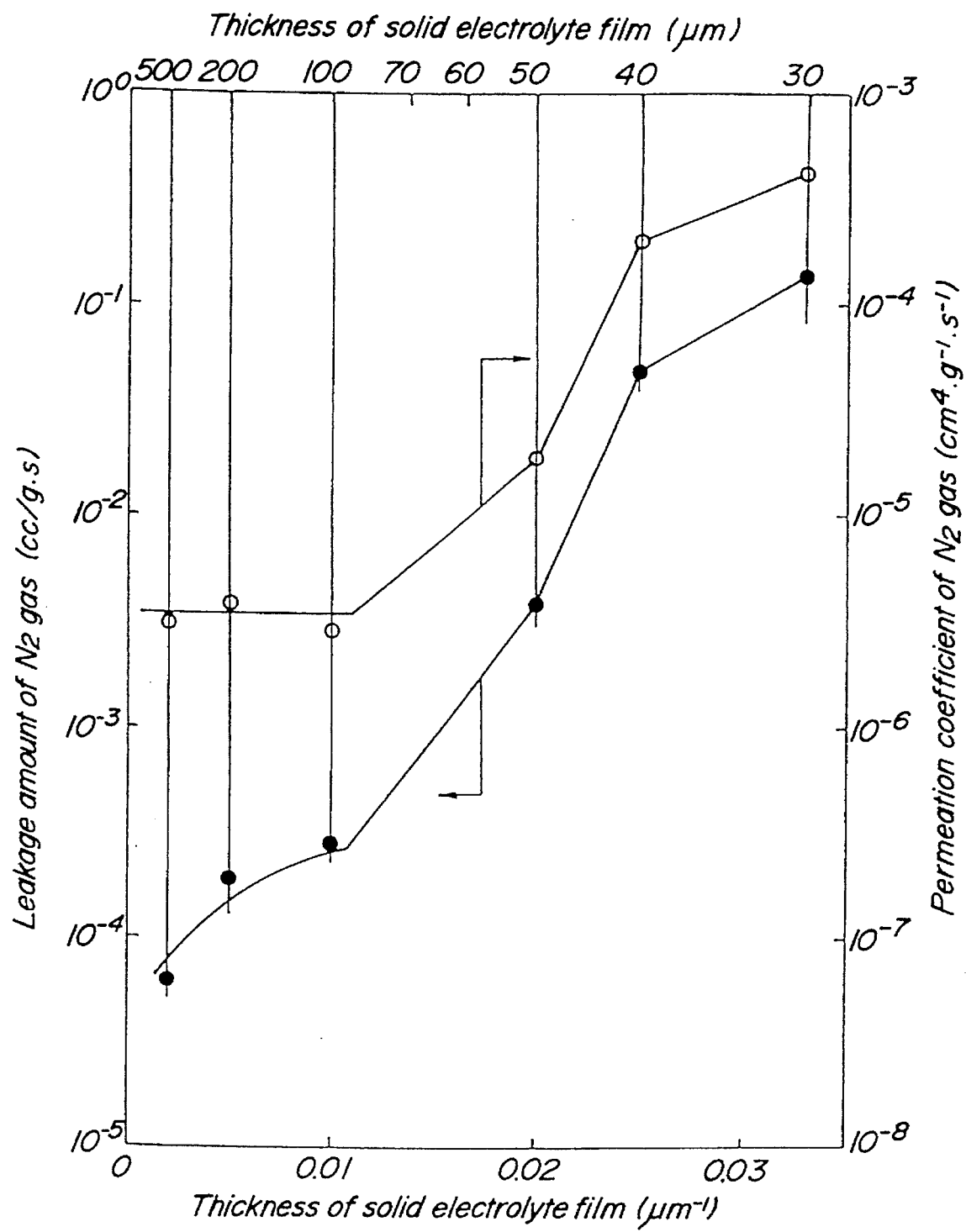
FIG. 8 is a graph showing relationship between thicknesses of solid electrolyte films and permeation coefficients of $N_2$ gas, and relationship between the thicknesses and amounts of $N_2$ gas leakage, in experiment 3 relating to first aspect of the present invention.

As understood from Table 3, in the present comparative examples, it is necessary to apply the solid electrolyte film with a thickness of not less than 200 μm for obtaining the test cell providing the OCV of more than 0.9 V. Moreover, when the thickness was not less than 200 μm, the resistance of the test cell was increased. Moreover, referring to a graph in FIG. 8 showing relationship of a permeation coefficient of $N_2$ gas and the thickness, when the thickness was larger than 100 μm, the permeation coefficient of $N_2$ gas was substantially constant. Therefore, when the thickness was 500 μm, the leakage amount of $N_2$ gas was larger than $10^{-5}$ cc/g.second, and then the OCV was only up to 0.96 V.

Experiment 4

Figure 9:
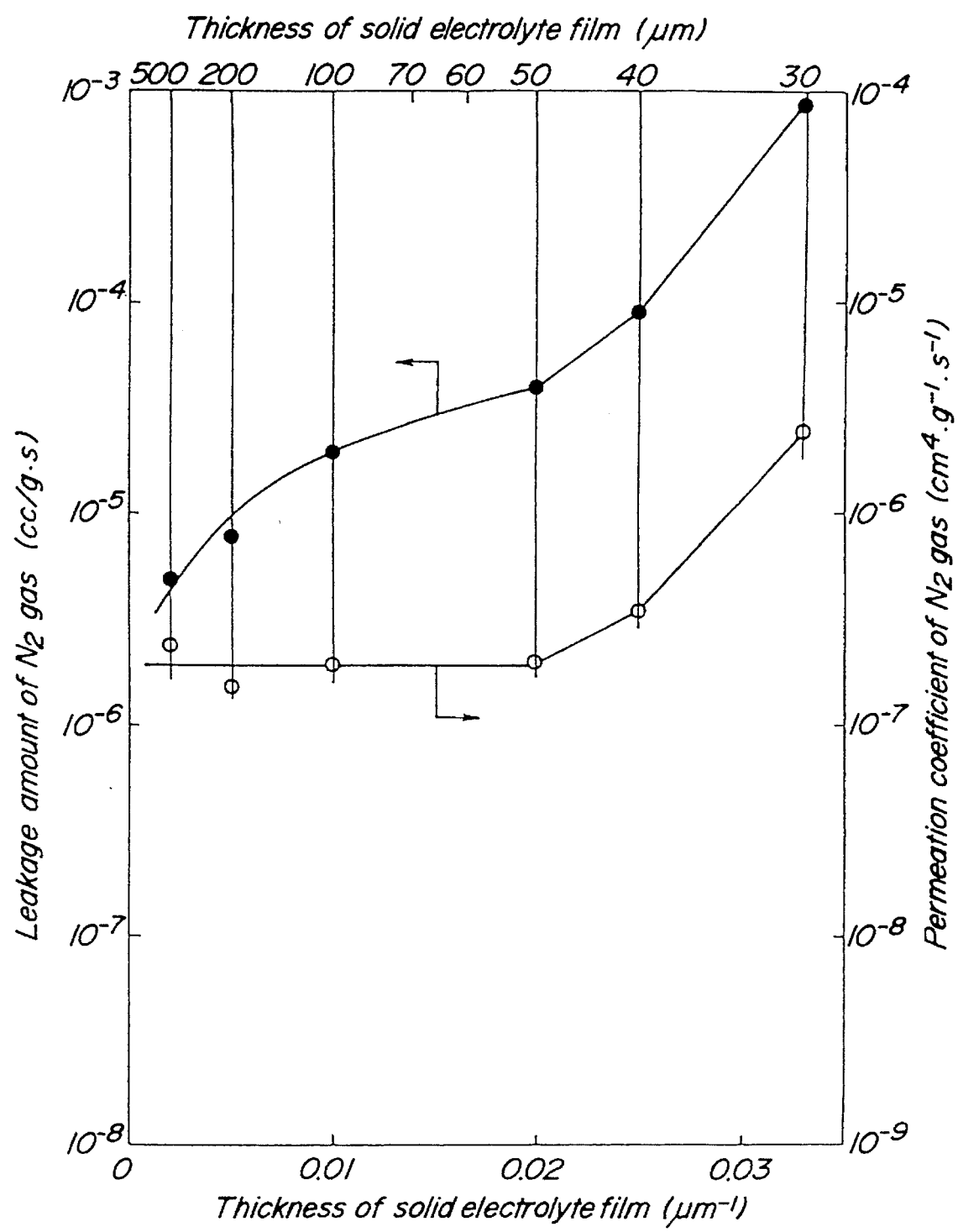
FIG. 9 is a graph showing relationship between thicknesses of solid electrolyte films and permeation coefficients of $N_2$ gas, and relationship between the thicknesses and amounts of $N_2$ gas leakage, in experiment 4 relating to first aspect of the present invention.

The same air electrode substrate and powdery raw material of 8 YSZ as used in the experiment 1 were prepared. The powdery raw material of 8 YSZ was sprayed on the surface of the air electrode substrate to form a sprayed film with a thickness of about 600 μm to provide a laminated body, which was then subjected to a heat treatment in an atmosphere at a temperature of 1550° C. for 5 hours to obtain a solid electrolyte film. The thus obtained film was then processed with a machine to provide experimental samples with thicknesses shown in Table 4. Moreover, a platinum paste was applied onto a surface of the solid electrolyte film and then fired to form an opposing electrode (a fuel electrode). Each test cell was thus produced and then tested as described in the experiment 1. The results are shown in Table 4 and FIG. 9.

TABLE 4

| A thickness of the solid electrolyte film (μm) | OCV (V) | Resistance ($\Omega cm^2$) |
|---|---|---|
| 500 | 1.11 | 3.10 |
| 200 | 1.11 | 2.61 |
| 100 | 0.93 | 2.51 |
| 50 | 0.75 | 2.35 |
| 40 | about 0 | 2.28 |
| 30 | about 0 | 2.21 |

As understood from Table 4, when the thickness was not less than 200 μm, the OCV was 1.11 V. However, the resistances of all the test cells were very high. This is due to the formation of a layer of $La_2Zr_2O_7$ having a high resistance between the solid electrolyte film and the air electrode body. Moreover, when the thickness was not less than 50

μm, the permeation coefficient of $N_2$ gas was substantially constant and at a level near $10^{-7}$ cm$^4$/g.second. In FIG. 7, this level of the coefficient was attained when the thickness was 500 μm. That is, in the present experiment 4, when the thickness was not less than 50 μm, the quality of the film was substantially constant. Therefore, when the thickness was not less than 200 μm, the leakage amount of $N_2$ gas was made below $10^{-5}$ cm$^4$/g.second. However, when the thickness was 100 μm, the leakage amount of $N_2$ gas was over $10^{-5}$ cm$^4$/g.second yet. As a result, when the thickness was 100 μm, the OCV was 0.93 V which was considerably smaller than its theoretical value.

As described above, by applying the solid oxide fuel cell according to first aspect of the invention, it is possible to provide a SOFC single cell with a high electromotive force, with a solid electrolyte film having a relatively small resistance and with an improved output.

The following experiments 5 to 8 relate to the solid oxide fuel cell according to a second aspect of the invention Experiment 5

A powder of Lanthanum manganite ($La_{0.9}Sr_{0.1}MnO_3$) was pressed with a pressure of 200 kgf/cm$^2$ to provide a formed body having a disk shape with a diameter of 50 mm and a thickness of 3 mm. The formed body was then sintered at a temperature of 1500° C. for 5 hours to provided a sintered body, which was then processed to provide an air electrode substrate having a porosity of 25% and having a disk shape with a diameter of 30 mm and a thickness of 1.5 mm. A powdery raw material consisting of a stabilized zirconia containing 8 mol % of $Y_2O_3$ (8YSZ), which was commercially available, and a powdery additive of an oxide of each metal element shown in FIG. 5 were prepared as materials for spraying. The powdery raw material of 8YSZ and the powdery additive of the oxide of each metal element were supplied into a spray gun portion by means of separate apparatuses for supplying powders, respectively. Then the powdery additive and the powderly raw material were melted in the spray gun portion to provide a molten mixture, which was then sprayed onto a surface of the air electrode substrate by atmospheric plasma spraying to obtain a sprayed film with a thickness of about 300 μm to provide a laminated body. The body was then subjected to a heat treatment at a temperature as shown in table 5 to provide a solid electrolyte film. Then a surface of the solid electrolyte film was grinded to obtain the solid electrolyte film with a thickness of 200 μm.

Then an opposing electrode (a fuel electrode) was formed on a central portion of the surface of the solid electrolyte film by screen printing a commercially available platinum paste thereon. The air electrode substrate was also metallized by screen printing a platinum paste on a central portion of the surface of the air electrode substrate and by firing the platinum paste at 1000° C. to provide a test cell. The thus manufactured test cell was used to test relationship of the internal resistance of the cell, the air-tight performance of the cell, the temperature at which the heat treatment was carried out and the added compound of the metal element.

The internal resistance of the cell was determined by measuring the ohmic resistance thereof by means of an alternating impedance method at 1000° C. in an atmosphere. The air-tight performance was evaluated as follows. Oxygen was introduced into a side of the air electrode and hydrogen gas was bubbled into water at a room temperature to obtain humitized hydrogen gas, which was then introduced into a side of the fuel electrode. Thus, the electromotive force of each cell was measured and used for evaluating the performance. Moreover, amounts of each metal elements in the solid electrolyte film were measured at positions, each position being distant about 10 μm from the adjoining position, in the film by means of an EPMA apparatus. An average amount of the above amounts measured at the positions are shown in Table 5.

TABLE 5

| | Compound of the metal element | Average amount (atom %) | Temperature of the heat treatment (°C.) | Electromotive force (V) | Resistance ($\Omega \cdot cm^2$) |
|---|---|---|---|---|---|
| Comparative Example 1 | — | — | 1600 | 1.11 | 1.9 |
| Example 1 | $Mn_3O_4$ | 1.2 | 1300 | 1.04 | 0.4 |
| Example 2 | " | 3.2 | 1500 | 1.10 | 0.3 |
| Example 3 | " | 6.3 | 1300 | 1.10 | 0.3 |
| Example 4 | " | 5.5 | 1500 | 1.11 | 0.2 |
| Example 5 | " | 11.7 | 1300 | 1.11 | 0.2 |
| Example 6 | " | 14.5 | 1500 | 1.11 | 0.2 |
| Comparative Example 2 | $Mn_3O_4$ | 0.8 | 1300 | 0.91 | 0.5 |
| Comparative Example 3 | " | 0.9 | 1500 | 0.98 | 0.8 |
| Comparative Example 4 | " | 16.2 | 1300 | 1.11 | 0.8 |
| Comparative Example 5 | " | 17.5 | 1500 | 1.11 | 0.8 |
| Example 7 | CoO | 5.2 | 1400 | 1.10 | 0.3 |
| Example 8 | $Fe_2O_3$ | 3.1 | 1400 | 1.10 | 0.5 |
| Example 9 | NiO | 3.3 | 1400 | 1.10 | 0.6 |
| Example 10 | CuO | 2.0 | 1400 | 1.09 | 0.5 |
| Example 11 | ZnO | 2.1 | 1400 | 1.09 | 0.5 |

As understood from the above examples, when the compound of the metal element was not contained, it was necessary to carry out the heat treatment at a temperature of 1600° C. for obtaining the electromotive force of 1.11 V. When the compound of the metal element was contained, it was possible to obtain the electromotive force of 1.11–1.09 V by carrying out the heat treatment at a temperature of 1300°–1500° C., which were 100°–300° C. lower than 1600° C. Therefore, the present invention was very effective to provide the solid electrolyte film with high air-tight performance. Moreover, in the comparative example 1, an insulating layer of $La_2Zr_2O_7$ was formed between the solid electrolyte film and the air electrode and the internal resistance of the cell was relatively high. However, when Mn or Co was contained in the solid electrolyte film, such layer were not formed and the internal resistance of the cell was considerably decreased. Moreover, when the other metal element was contained in the film, the temperature at which the heat treatment was carried out was lowered compared to 1600° C. in the comparative example 1, as a result, the formation of $La_2Zr_2O_7$ was reduced. Thus the electromotive force equivalent to that in the cell of the comparative example 1 was attained with its internal resistance considerably decreased. Therefore, the invention was considered to be very effective for improving the generating performance of the SOFC cell.

When Mn was the selected metal element, as understood from the examples 1 to 6 and the comparative example 2 to 5, when Mn was contained in the film in an amount of not less than 1 atom %, the electromotive force was more than 1 V, and the air-tight performance of the film was considerably improved. When Mn was contained in the film in an amount of more than 15 atom %, the resistance was increased. In particular, when the amount was 3–12 atom %, the air-tight performance was sufficiently high and the resistance was most reduced.

Then, FIG. 10 is a graph showing relationship between amounts of manganese in the air electrode substrate and in the solid electrolyte film in example 4 in Table 5 versus the positions at which the amounts were measured by means of the EPMA apparatus. The vertical axis of FIG. 10 shows the amounts and the horizontal axis shows distances of the positions. The distance is 100 μm at the boundary of the film and the substrate. That is, the distances are measured from the position which is 100 μm distant from the boundary in the substrate. In the solid electrolyte film, the amounts of manganese were measured at 20 positions. An average amount of the 20 amounts measured at the 20 positions was 5.5 atom % and its deviation was ±0.8 atom %. In the amounts at the 20 positions in the solid electrolyte film, only 10 amounts measured at 10 positions were shown in FIG. 10 (This is same in FIGS. 11–14.). As understood by the results shown in FIG. 10, the metal element was contained in the solid electrolyte film in amounts which were substantially constant in the positions in the film.

Experiment 6

An air electrode substrate was produced as described in the experiment 5. Manganese dioxide ($MnO_2$) was sprayed on the surface of the air electrode substrate by means of an atmospheric plasma spraying method to form an intermediate layer with a thickness of 5 to 10 μm. Then, 8YSZ was sprayed on the surface of the intermediate layer by an atmospheric plasma spraying method to form a sprayed film of a zirconia with a thickness of about 300 μm. The thus obtained sprayed film was then subjected to a heat treatment in an atmosphere at a temperature of 1400° C. for 3 hours to provide a solid electrolyte film. Then a surface of the solid electrolyte film was grinded to obtain the solid electrolyte film with a thickness of 200 μm. An opposing electrode (a fuel electrode) was formed on a central portion of the surface of the solid electrolyte film by screen printing a commercially available platinum paste thereon. The air electrode substrate was also metallized by screen printing a platinum paste on a central portion of the surface of the air electrode substrate and by firing the platinum paste at 1000° C. to provide a test cell.

The thus manufactured test cell was used to carry out the same measurements as described in the experiment 5. As a result, the electromotive force was 1.12 V and the resistance was 0.2 $\Omega cm^2$. That is, a high air-tight performance and a low resistance sufficient for a SOFC cell were attained. FIG. 11 is a graph showing relationship between amounts of manganese in the air electrode substrate and in the solid electrolyte film versus positions at which the amounts were measured. The amounts were measured by means of an EPMA apparatus. The horizontal axis shows distances of the positions in a direction of a thickness of the test cell. The distances are measured from the position, which is 100 μm distant from the boundary between the film and the substrate, in the substrate.

As shown in FIG. 11, the amount of manganese was about 13 atom % at the position in the film near the boundary between the film and the air electrode substrate, and the amounts were decreased as a distance of the position at which each amount was measured from the air electrode substrate was increased. Besides, an average value of the 20 amounts of manganese measured at 20 positions in the solid electrolyte film was 6.2 atom %.

Experiment 7

Same air electrode substrate as the experiment 5 was prepared. A fuel electrode substrate consisting of a nickel-zirconia cermet was also prepared. A powdery raw material of 8YSZ was sprayed on the surface of the air electrode body (example 12) or on the surface of the fuel electrode body by means of an atmospheric plasma spraying method to form a sprayed film with a thickness of about 300 μm. A surface of the sprayed film was then grinded to obtain the sprayed film with a thickness of about 200 μm. $MnO_2$ was then sprayed onto the surface of the sprayed film by an atmospheric plasma spraying method to form a surface layer with a thickness of 5 to 10 μm to provide a laminated body, which was then subjected to a heat treatment in an atmosphere at 1400° C. for 3 hours and the surface layer was disappeared. Then, as described in the experiment 5, an opposing electrode was formed and each electrode substrate was metallized using a platinum paste to provide a test cell. The thus manufactured test cell was used for same measurement as described in the experiment 5 to obtain the results shown in Table 6.

TABLE 6

|  | Composition of the substrate | Electromotive Force (V) | Resistance ($\Omega cm^2$) |
| --- | --- | --- | --- |
| Example 12 | $La_{0.9}Sr_{0.1}MnO_3$ | 1.10 | 0.5 |
| Example 13 | $Ni-ZrO_2$ | 1.11 | 0.2 |

As understood from Table 6, both in the example 12 and the example 13, a high air-tight performance and a low resistivity sufficient for a SOFC cell was attained. However, the test cell of the example 12 has a higher resistance than that of the cell of the example 13. This result may be considered that a relatively small amount of $La_2Zr_2O_7$ was formed between the air electrode body and the solid electrolyte film during the heat treatment.

FIG. 12 is a graph showing relationship between amounts of manganese in the air electrode substrate and in the solid electrolyte film versus positions at which the amounts were measured. FIG. 13 is a graph showing relationship between amounts of manganese in the fuel electrode substrate and in the solid electrolyte film versus the positions. The horizontal axises in FIGS. 12 and 13 show distances of the positions in a direction of a thickness of the test cell. The distances are measured from the position, which is 100 μm distant from the boundary between the film and the substrate, in the substrate.

Referring to FIG. 12, in the example 12, manganese was contained in an amount of about 14 atom % near a boundary between the solid electrolyte film and the fuel electrode (the opposing electrode). The boundary correspond to a position at which the distance shown in FIG. 12 is 300 μm. The amount of manganese contained in the film was gradually decreased as the position at which the amount was measured approaches to a boundary between the film and the air electrode substrate (The boundary correspond to a position at which the distance shown in FIG. 12 is 100 μm). However, a peak is shown in a graph in FIG. 12 near the boundary between the film and the air electrode substrate. This peak is due to the diffusion of manganese into the solid electrolyte film from the air electrode substrate. Referring to FIG. 13, in the example 13, manganese was contained in an amount of about 14 atom % near a boundary between the solid electrolyte film and the air electrode (the opposing electrode). The boundary correspond to a position at which the distance shown in FIG. 13 is 300 μm. The amount of manganese contained in the film was gradually decreased as the position at which the amount was measured approaches to a boundary between the film and the fuel electrode substrate. The boundary correspond to a position at which the distance shown in FIG. 13 is 100 μm.

Experiment 8

An air electrode substrate was manufactured as described in the experiment 5. Manganese dioxide was sprayed on the surface of the substrate by means of an atmospheric plasma spraying method to form an intermediate layer with a thickness of 5 to 10 μm. Then, 8YSZ was sprayed on the surface of the layer by an atmospheric plasma spraying method to form a sprayed film of a zirconia with a thickness of about 200 μm. Moreover, Manganese dioxide was sprayed on the sprayed film by means of an atmospheric plasma spraying method to form a surface layer with a thickness of 5 to 10 μm to provide a laminated body. The thus obtained laminated body was then subjected to a heat treatment in an atmosphere at a temperature of 1400° C. for 3 hours to form a solid electrolyte film. Then, as described in the experiment 5, the opposing electrode (the fuel electrode) was formed and the air electrode substrate was metallized by using a platinum paste. The thus manufactured test cell was used to carry out the same measurements as described in the experiment 5.

As a result, the electromotive force was 1.11 V and the resistance was 0.2 Ωcm². That is, a high air-tight performance and a low resistance sufficient for a SOFC cell were attained. FIG. 14 is a graph showing relationship between amounts of manganese in the air electrode substrate and in the solid electrolyte film versus positions at which the amounts were measured. The amounts were measured by means of an EPMA apparatus. The horizontal axis shows distances of the positions in a direction of a thickness of the test cell. The distances are measured from the position, which is 100 μm distant from the boundary between the film and the substrate, in the substrate. As shown in FIG. 14, the amount of manganese was 12–15 atom % at the position in the film near the boundary between the film and the air electrode substrate (The boundary correspond to a position at which the distance shown in FIG. 14 is 100 μm.). The amount was also 12–15 atom % at the position near the boundary between the film and the fuel electrode film (the opposing electrode) (The boundary correspond to a position at which the distance shown in FIG. 14 is 300 μm.). The amounts was about 2 atom % in a central portion of the solid electrolyte film.

As described above, according to the solid oxide fuel cell of second aspect of the present invention, at least one metal element selected from the group consisting of manganese, iron, cobalt, nickel, copper and zinc is contained in a solid electrolyte portion in an average amount of not less than 1 atom % based on a sum of amounts of all metal elements contained in the solid electrolyte portion. Therefore, the densification of the solid electrolyte portion is progressed and thus the solid electrolyte portion having air-tight performance superior to that of prior ones may be provided. Consequently, it is possible to obtain the solid electrolyte portion having sufficient air-tight performance for preventing leakage of a fuel when thinning the solid electrolyte portion. An internal resistance of a SOFC single cell may be reduced and an output per the single cell may be improved by thinning the solid electrolyte portion. Moreover, because the average amount was not more than 15 atom %, precipitation of the above metal element into the grain boundaries in the portion may be effectively prevented and thus the resistivity of the solid electrolyte portion may be reduced.

The following experiments 9 and 10 relate to the process for producing a solid electrolyte film and a solid oxide fuel cell according to third, fourth and fifth aspects of the invention.

Experiment 9

A powder of Lanthanum manganite was pressed with a pressure of 200 kgf/cm² to provide a formed body having a disk shape with a diameter of 50 mm and a thickness of 3 mm. The formed body was then sintered at a temperature of 1550° C. for 5 hours to provide a sintered body, which was then processed to provide an air electrode substrate having a porosity of 19% and having a disk shape with a diameter of 30 mm and a thickness of 1.5 mm. An electrofused zirconia was grinded to prepare a powdery raw material consisting of a stabilized zirconia containing 8 mol % of $Y_2O_3$ (8YSZ) as a powdery raw material for a solid electrolyte. A powdery additive of manganese dioxide ($MnO_2$) was prepared. Distribution of particle diameters in the above powdery raw material of 8YSZ was measured by means of a laser diffraction method and its average particle diameter was shown in the following Table 7.

Then, the powdery raw material of 8YSZ and the powdery additive of manganese dioxide were mixed to produce a mixed powder so that an amount of manganese (atom %) based on a sum of amounts of all metal elements contained in the mixed powder was changed as shown in Table 7. Each mixed powder shown in Table 7 was plasma sprayed on the air electrode substrate to form a sprayed film with a thickness of about 300 μm. The thus obtained sprayed film was then subjected to a heat treatment in an atmosphere for 4 hours in a condition shown in Table 7 to produce a solid electrolyte film. A surface of the solid electrolyte film was then processed by means of a machine to provide a film with a thickness of 200 μm to provide each test sample. A permeation coefficient of $N_2$ gas of the thus obtained test sample was measured for evaluating the air-tight performance thereof. The results are shown in table 7.

TABLE 7

| | Average diameter of the material of 8YSZ | Amount of manganese (atom %) | Temperature of heat treatment (°C.) | Permeation coefficient of $N_2$ gas $(cm^4 g^{-1} S^{-1})$ |
|---|---|---|---|---|
| Comparative Example 1-1 | 3.1 | — | — | — |
| Comparative Example 2-1 | 8.5 | 1 | 1350 | $6.9 \times 10^{-8}$ |
| Example 1-1 | 10.1 | 1 | 1350 | $8.8 \times 10^{-8}$ |
| Example 1-2 | 10.1 | 1 | 1430 | $3.8 \times 10^{-8}$ |
| Example 1-3 | 10.1 | 3 | 1430 | $5.2 \times 10^{-9}$ |
| Example 1-4 | 10.1 | 5 | 1430 | $1.0 \times 10^{-9}$ |
| Example 2-1 | 15.7 | 1 | 1430 | $9.3 \times 10^{-8}$ |
| Example 2-2 | 15.7 | 5 | 1430 | $1.1 \times 10^{-8}$ |
| Example 3-1 | 28.9 | 1 | 1500 | $1.7 \times 10^{-8}$ |
| Example 3-2 | 28.9 | 5 | 1430 | $3.2 \times 10^{-8}$ |
| Example 3-3 | 28.9 | 15 | 1350 | $7.2 \times 10^{-8}$ |
| Example 4-1 | 38.7 | 1 | 1500 | $8.3 \times 10^{-8}$ |
| Example 4-2 | 38.7 | 5 | 1430 | $8.1 \times 10^{-8}$ |
| Example 4-3 | 38.7 | 15 | 1350 | $9.0 \times 10^{-8}$ |
| Comparative Example 3-1 | 42.5 | 15 | 1500 | $2.5 \times 10^{-7}$ |

In the comparative examples 1-1 and 1-2, when the mixed powders were supplied into an spray gun portion through an apparatus for supplying powders, the mixed powder did not flow in the apparatus smoothly. In particular, in the comparative example 1-1, it was impossible to form the sprayed film. In the comparative example 2-1, it was possible to form the sprayed film on the substrate, however, a weight of the sprayed film is only less than 10% compared to a weight of the mixed powder supplied into the apparatus, that is, a yield of the sprayed film based on the weight of the supplied mixed powder was considerably low. This result was considered that a weight of each particle in the mixed powder was too small to be introduced smoothly into the spray gun portion. In all the examples of the invention, high quality solid electrolyte films with the permeation coefficients of $N_2$ gas less than $10^{-7} cm^4 g^{-1} s^{-1}$ were produced by applying the heat treatment at a relatively low temperature in a range of 1350°–1500° C.

A relationship between the average particle diameter of the powdery raw material of 8YSZ and the amount of manganese will be considered below.

When comparing the results of the examples 1-2, 1-3 and 1-4 or when comparing the results of the examples 2-1 and 2-2, as the amount of manganese is larger, the air-tight performance, which may be evaluated by the permeation coefficient of $N_2$ gas, is more improved.

In the examples 1-4, 2-2, 3-2 and 4-2, the amount of manganese was fixed to 5 atom % and the temperature of the heat treatment was fixed to 1430° C. When comparing the results of these examples, as the average particle diameter of the powdery raw material is smaller, the air-tight performance of the solid electrolyte film is improved. In the example 1-1 and the comparative example 2-1, the amount of manganese was fixed to 1 atom % and the temperature of the heat treatment was fixed to 1350° C. When comparing the results of the example 1-1 and the comparative example 2-1, as the average particle diameter is smaller, the air-tight performance is also improved. In the comparative example 3-1, the average diameter was 42.5 μm. In this example, the amount of manganese was increased to 15 atom % and the temperature of the heat treatment was increased to 1500° C. for densifying the solid electrolyte film. However, under such good condition for obtaining the film with the high air-tight performance, the resulting permeation coefficient of $N_2$ gas of the film was more than $10^{-7} cm^4 g^{-1} s^{-1}$. On the contrary, in the example 4-3, the average particle diameter was 38.7 μm, which is only 3.8 μm different from 42.5 μm, and the temperature of the heat treatment was decreased to 1350° C. However, the resulting permeation coefficient of $N_2$ gas of the film was less than $10^{-7} cm^4 g^{-1} s^{-1}$.

In the comparative example 2-1, the solid electrolyte film has the sufficient air-tight performance, however, the average particle diameter of the powdery raw material of 8YSZ is less than 10 μm and therefore the yield of the sprayed film based on the weight of the supplied mixed powder was considerably low. Such process is inappropriate for mass production.

As understood from the above examples, it is possible to produce the solid electrolyte film with the sufficient air-tight performance by applying the powdery raw material having the average diameter of not more than 40 μm and by adding manganese etc. into the film in an amount of 1–15 atom %, when the temperature of the heat treatment is 1350°–1500° C.

Moreover, when carrying out the present invention in a practical producing system in a factory, the amount of the compound of the selected metal element and the average particle diameter of the powdery raw material of 8YSZ may be selected independently to each other. The temperature of the heat treatment may be selected to obtain the solid electrolyte film having the sufficient air-tight performance and is preferably lower. Such optimum temperature is changed when the above amount and the average particle diameter is changed. The temperature of the heat treatment may be selected independently to the above amount and the average particle diameter. Then, an optimum combination of the temperature, the above amount and the average particle diameter may be selected easily when carrying out the present invention in the practical producing system.

Experiment 10

A powdery raw material consisting of 8YSZ having an average particle diameter of 0.2 μm was prepared by a coprecipitation method. A powdery additive of manganese dioxide ($MnO_2$) was mixed to the powderly raw material to produce a mixed powder so that an amount of manganese (atom %) based on a sum of amounts of all metal elements contained in the mixed powder was 5 atom %. Water and the mixed powder was mixed by an attriter to provide a slurry, which was then supplied into an apparatus for spray drying to form granulated powders having average particle diameters shown in table 8. "The average particle diameters" shown in table 8 were measured by a laser diffraction method.

The thus obtained granulated powder of each example was plasma sprayed on the surface of the air electrode substrate used in the experiment 9 to form a sprayed film with a thickness of about 300 μm. The thus obtained sprayed film of each example was subjected to a heat treatment at 1430° C. in an atmosphere for 4 hours to form a solid electrolyte film. A surface of the solid electrolyte film was processed by a machine to form a film with a thickness of 200 μm to obtain each test sample. A permeation coefficient of $N_2$ gas of the thus manufactured test sample was measured for evaluating the air-tight performance thereof. The results are shown in Table 8.

TABLE 8

|  | Average particle diameter of the granulated powder (μm) | Permeation coefficient of $N_2$ gas ($cm^4 g^{-1} S^{-1}$) |
| --- | --- | --- |
| Comparative Example 4-1 | 9.2 | $1.5 \times 10^{-8}$ |
| Example 5-1 | 11.9 | $3.1 \times 10^{-9}$ |
| Example 5-2 | 17.5 | $2.3 \times 10^{-8}$ |
| Example 5-3 | 32.7 | $5.4 \times 10^{-8}$ |
| Example 5-4 | 39.0 | $9.2 \times 10^{-8}$ |
| Comparative Example 5-1 | 45.1 | $8.7 \times 10^{-7}$ |

As understood from the results shown in Table 8, when the mixed powder was granulated to form the granulated powder which was plasma sprayed to form a sprayed film, it is possible to produce an air-tight solid electrolyte film having a permeation coefficient of $N_2$ gas less than $1 \times 10^{-7}$ $cm^4 \ g^{-1} \ s^{-1}$ by applying the granulated powder having an average particle diameter of not more than 40 μm. That is, the inventors found that the average particle diameter of the granulated powder was critically important when the mixed powder of the material of 8YSZ and the additive of manganese dioxide was granulated to form the granulated powder. The solid electrolyte film of the comparative example 4-1 had a permeation coefficient of $N_2$ gas less than $1 \times 10^{-7}$ $cm^4 \ g^{-1} \ s^{-1}$, however, the yield of a weight of the sprayed film based on a weight of the granulated powder was considerably decreased as in the example 2-1 in the experiment 9. Such process is considered to be inappropriate for mass production.

As described above, according to the process for producing a solid electrolyte film and a solid oxide fuel cell of third, fourth and fifth aspects of the invention, a solid electrolyte film with sufficient air-tight performance may be manufactured in a large scale by applying a spraying method suitable for mass production. Moreover, when the sprayed film is subjected to a heat treatment to progress the densification thereof, it is possible to progress the densification at a relatively low temperature and to produce a solid electrolyte film having the sufficient air-tight performance.

We claim:

1. A solid oxide fuel cell comprising an ion conductive solid electrolyte layer formed by a spraying method, said solid electrolyte layer comprising at least one metal element present throughout, said at least one metal element being selected from the group consisting of manganese, cobalt, nickel, copper and zinc, wherein a thickness of said solid electrolyte layer is not less than 40 μm and not more than 100 μm, and a leakage amount of $N_2$ gas of said solid electrolyte layer at room temperature is not more than $10^{-5}$ cc/g.second.

2. The solid oxide fuel cell of claim 1, wherein a permeation coefficient of said solid electrolyte layer is not more than $10^{-7}$ $cm^4$/g.second at room temperature.

3. The solid oxide fuel cell of claim 1, wherein said solid electrolyte layer consists essentially of said at least one metal element and a zirconium oxide selected from the group consisting of stabilized zirconium oxide and partially stabilized zirconium oxide.

4. The solid oxide fuel cell of claim 1, further comprising first and second electrodes sandwiching said solid electrolyte layer, wherein said metal element is present throughout said solid electrolyte layer in decreasing concentration from one boundary between said layer and said first electrode to another boundary between said layer and said second electrode.

5. The solid oxide fuel cell of claim 1, further comprising air and fuel electrodes sandwiching said solid electrolyte layer, wherein said metal element is substantially uniformly present throughout said solid electrolyte layer from one boundary between said layer and said air electrode to another boundary between said layer and said fuel electrode.

6. The solid oxide fuel cell of claim 1, wherein said metal element is present in said solid electrolyte layer in an amount not less than 1 atom % and not more than 15 atom % based on a sum of amounts of all metal elements present in said solid electrolyte layer.

7. A solid oxide fuel cell comprising an ion conductive solid electrolyte layer comprising at least one metal element present throughout, said at least one metal element being selected from the group consisting of manganese, cobalt, nickel, copper and zinc, said metal element being present in an average amount not less than 1 atom % and not more than 15 atom % based on a sum of amounts of all metal elements contained in said solid electrolyte layer.

8. The solid oxide fuel cell of claim 7, wherein said solid electrolyte layer consists essentially of said at least one metal element and a zirconium oxide selected from the group consisting of stabilized zirconium oxide and partially stabilized zirconium oxide.

9. The solid oxide fuel cell of claim 7, further comprising first and second electrodes sandwiching said solid electrolyte layer, wherein said metal element is present throughout said solid electrolyte layer in decreasing concentration from one boundary between said layer and said first electrode to another boundary between said layer and said second electrode.

10. The solid oxide fuel cell of claim 7, further comprising air and fuel electrodes sandwiching said solid electrolyte layer, wherein an amount of said metal element in a region near a boundary between the solid electrolyte layer and the air electrode is larger than an amount of said metal element in a central region of the solid electrolyte layer, and an amount of said metal element in a region near a boundary between the solid electrolyte layer and the fuel electrode is larger than an amount of said metal element in the central region of the solid electrolyte layer.

11. The solid oxide fuel cell of claim 10, wherein the amount of said metal element present in each of (i) the region near the boundary between the solid electrolyte layer and the air electrode and (ii) in the region near the boundary between the solid electrolyte layer and the fuel electrode is divided by the amount of said metal element in the central region of the solid electrolyte layer to provide a value not less than 1.3.

12. The solid oxide fuel cell of claim 7, wherein said metal element is substantially uniformly present throughout said solid electrolyte layer.

13. The solid oxide fuel cell of claim 1, wherein said at least one metal element is selected from the group consisting of manganese and cobalt.

14. The solid oxide fuel cell of claim 1, wherein said at least one metal element consists of manganese.

15. The solid oxide fuel cell of claim 7, wherein said at least one metal element is selected from the group consisting of manganese and cobalt.

16. The solid oxide fuel cell of claim 7, wherein said at least one metal element consists of manganese.

17. The solid fuel cell of claim 7, wherein said average amount of said metal element is not less than 3 atom % and not more than 12 atom %.

* * * * *